United States Patent
Klinger et al.

(10) Patent No.: US 9,911,346 B2
(45) Date of Patent: Mar. 6, 2018

(54) UNMANNED VEHICLE, SYSTEM AND METHOD FOR CORRECTING A TRAJECTORY OF AN UNMANNED VEHICLE

(71) Applicant: Proxy Technologies, Inc., Reston, VA (US)

(72) Inventors: John Klinger, Reston, VA (US); Patrick C. Cesarano, Washington, DC (US)

(73) Assignee: PROXY TECHNOLOGIES, INC., Reston, VA (US)

( * ) Notice: Subject to any disclaimer, the term of this patent is extended or adjusted under 35 U.S.C. 154(b) by 0 days.

(21) Appl. No.: 15/206,216

(22) Filed: Jul. 8, 2016

(65) Prior Publication Data

US 2017/0229029 A1     Aug. 10, 2017

Related U.S. Application Data

(60) Provisional application No. 62/291,344, filed on Feb. 4, 2016.

(51) Int. Cl.
| | |
|---|---|
| *G08G 9/02* | (2006.01) |
| *B64C 39/02* | (2006.01) |
| *G05D 1/00* | (2006.01) |
| *G05D 1/10* | (2006.01) |
| *G08G 5/04* | (2006.01) |

(52) U.S. Cl.
CPC ............. *G08G 9/02* (2013.01); *B64C 39/024* (2013.01); *G05D 1/0088* (2013.01); *G05D 1/104* (2013.01); *G08G 5/045* (2013.01); *B64C 2201/143* (2013.01); *G05D 2201/0207* (2013.01)

(58) Field of Classification Search
CPC ........ G08G 9/02; G08G 5/045; G08G 5/0069; B64C 39/024; B64C 2201/143; G05D 1/0088; G05D 1/104; G05D 2201/0207; G05D 1/0027
See application file for complete search history.

(56) References Cited

U.S. PATENT DOCUMENTS

| | | | | |
|---|---|---|---|---|
| 7,228,227 | B2 * | 6/2007 | Speer | G01C 21/00 340/988 |
| 7,469,183 | B2 * | 12/2008 | Bodin | G05D 1/0027 701/23 |
| 8,874,360 | B2 * | 10/2014 | Klinger | G08G 1/162 701/22 |

(Continued)

*Primary Examiner* — Jason Holloway
(74) *Attorney, Agent, or Firm* — Kenealy Vaidya LLP

(57) ABSTRACT

Some embodiments are directed to an unmanned vehicle for use with a companion unmanned vehicle. The unmanned vehicle includes a position unit that is configured to determine a current position of the unmanned vehicle. The unmanned vehicle includes a memory unit that is configured to store a planned path of the unmanned vehicle. The unmanned vehicle includes a control unit that is configured to determine that the unmanned vehicle is off-course based on the current position of the unmanned vehicle and the planned path assigned to the unmanned vehicle, generate a delay and a corrected path for the unmanned vehicle, and communicate the delay and the corrected path to the companion unmanned vehicle. The control unit is further configured to control a movement of the unmanned vehicle along the corrected path after the delay.

20 Claims, 8 Drawing Sheets

(56) References Cited

U.S. PATENT DOCUMENTS

| | | | | |
|---|---|---|---|---|
| 8,924,069 B1* | 12/2014 | Kaneshige | ............... | G05D 1/12 |
| | | | | 701/23 |
| 9,202,382 B2* | 12/2015 | Klinger | .................. | G08G 1/162 |
| 9,599,994 B1* | 3/2017 | Bogdanowicz | ........ | G05D 1/104 |
| 2007/0021880 A1* | 1/2007 | Appleby | ................ | G05D 1/104 |
| | | | | 701/23 |
| 2008/0243372 A1* | 10/2008 | Bodin | .................. | G05D 1/0027 |
| | | | | 701/23 |
| 2009/0118875 A1* | 5/2009 | Stroud | .................. | G01S 5/0027 |
| | | | | 701/3 |
| 2014/0081505 A1* | 3/2014 | Klinger | .................. | G08G 1/162 |
| | | | | 701/25 |
| 2014/0249693 A1* | 9/2014 | Stark | .................... | B64C 39/024 |
| | | | | 701/2 |
| 2015/0142211 A1* | 5/2015 | Shehata | ................. | H04N 7/181 |
| | | | | 701/2 |

* cited by examiner

UNMANNED VEHICLE, SYSTEM AND METHOD FOR CORRECTING A TRAJECTORY OF AN UNMANNED VEHICLE

PRIORITY INFORMATION

This Application claims priority to provisional Application 62/291,344 filed on Feb. 4, 2016. The substance of Application 62/291,344 is hereby incorporated in its entirety into this Application.

BACKGROUND

The disclosed subject matter relates to unmanned vehicles, systems and methods for controlling unmanned vehicles or optionally manned vehicles. More particularly, the disclosed subject matter relates to systems and methods for correcting a trajectory of an unmanned vehicle or an optionally manned vehicle, and systems and methods for correcting trajectories of unmanned vehicles or optionally unmanned vehicles in a fleet.

An unmanned vehicle is a vehicle without a person on board, which are capable of sensing their own surrounding and navigating on their own. The unmanned vehicle can operate in, but is not restricted to, air, water, land and so forth. The unmanned vehicle can be either operated autonomously or remotely operated by an operator.

Optionally manned vehicles can be operated with or without a person on board. Optionally manned vehicles may enable manual testing of the vehicles before unmanned operation, or allow manual control if necessary during an unmanned mode of operation.

Unmanned vehicles are vulnerable to collisions with each other and/or with obstacles present in their operational environments. These collisions may result from lack of geographical information about the obstacles and/or unforeseen environmental conditions. Additionally, a fleet of two or more unmanned vehicles may have increased likelihood of such collisions, since each unmanned vehicle in the fleet may be subject to the similar changes in the environment. Further, an unmanned vehicle may have a non-urgent reason to modify its planned path. For example, the vehicle may be running low on fuel or experiencing minor engine or navigational problems that would necessitate calculating a new planned path, or for any other reason.

Similarly, optionally manned vehicles may also be susceptible to collisions with each other and/or with obstacles or any other of the aforementioned problems.

SUMMARY

Unmanned vehicles are often in jeopardy of colliding with each other (vehicle to vehicle collisions) and/or with obstacles present in their operational environments. For example, a single unmanned aerial vehicle on its course can collide with known structures, such as, but not restricted to, buildings, antennas, terrain, and the like. Specifically, a single unmanned terrestrial, aquatic, oceanic or space vehicle can suffer similar collisions with structures, such as, but not restricted to, trees, rocks, bodies of water, sand banks, coral, orbital debris, and so forth. An unmanned vehicle may also have one or more non-urgent reasons to modify its planned path due to any number of factors such as vehicle mechanics (engine, wings, wheels, blades, etc.), electronic systems or sub-systems, navigational anomalies, weather, etc.

Such vehicle to vehicle collisions and/or collisions between unmanned vehicles and obstacles may result from lack of geographic information of the obstacles or due to a change in environmental conditions, such as, but not restricted to, changes in wind patterns, rain, snow, and the like. These changes may cause the unmanned vehicles to unpredictably veer off-course leading to one or more collisions.

Further, a fleet of unmanned vehicles may face increased possibilities of immediate or potential problems as each unmanned vehicle is subject to similar unpredictable changes in their operational environments.

Some related arts disclose unmanned vehicles that are capable of detecting potential problems and correcting various details of an original planned path to create a new planned path in order to avoid or impede collisions with various obstacles in the original planned path. The details of the original planned path, such as direction, velocity, elevation, etc., can be changed by the unmanned vehicles. In some other related arts, unmanned vehicle in a fleet can also change their paths on detecting potential problems among each other.

However, mechanical, electrical or environmental constraints can render such corrections in the paths unpredictably sporadic or extreme in nature, such that the corrections can be difficult for other unmanned vehicles to follow. For example, a first unmanned vehicle in a fleet of unmanned vehicles may perform unanticipated or extreme corrections to its path. The path corrections may provide other unmanned vehicles in the fleet with less time or inadequate resources to execute a similar problem deterrence procedure due to the unpredictable actions of the first unmanned vehicle. This may further cause the unmanned vehicles in the fleet to collide with one another. Moreover, the first unmanned vehicle may be able to avoid or impede a collision with an obstacle, while one or more of the other unmanned vehicles can be prone to collisions with the obstacles due to insufficient response time.

Optionally manned vehicles can face similar problems as described above with reference to unmanned vehicles. Specifically, optionally manned vehicles can suffer from any number of problems during an unmanned mode of operation.

It may therefore be beneficial to provide an unmanned vehicle, a system and a method for correcting a trajectory of the unmanned vehicle that addresses at least one of the above issues. For instance, it may be beneficial to gradually correct a trajectory of an unmanned vehicle in order to accomplish urgent problems such as collision avoidance or even other non-urgent problems. It may also be beneficial to notify the accompanying unmanned vehicles about the correction in the trajectory so that the accompanying unmanned vehicles have sufficient response time.

It may therefore be beneficial to provide an unmanned vehicle, a system and a method for correcting a trajectory of the unmanned vehicle that addresses at least one of the above and/or other disadvantages. In particular, it may be beneficial to provide an unmanned vehicle, a system and a method for providing a time delay before correcting the trajectory of a first unmanned vehicle so that accompanying unmanned vehicles can estimate a change in the position of the first unmanned vehicle and adjust their paths accordingly.

It may therefore be beneficial to provide an unmanned vehicle, a system and a method for correcting a trajectory of the unmanned vehicle that addresses at least one of the above and/or other disadvantages. In particular, it may be beneficial to provide an unmanned vehicle, a system and a method for developing an intermediate path to gradually correct a trajectory of a first unmanned vehicle so that accompanying unmanned vehicles can have sufficient time to adjust their paths accordingly.

It may therefore be beneficial to provide an optionally manned vehicle, a system and a method for gradually correcting a trajectory of the optionally manned vehicle in order to accomplish collision avoidance. Gradual correction in the trajectory can involve a time delay and/or an intermediate path. It may also be beneficial to notify the accompanying unmanned and/or optionally manned vehicles about the correction in the trajectory so that the accompanying unmanned vehicles have sufficient response time.

Some embodiments are therefore directed to a method of controlling an unmanned vehicle for use with a companion unmanned vehicle, the unmanned vehicle being operatively coupled to a controller. The method can include determining, by the controller, a current position of the unmanned vehicle; determining, by the controller, that the unmanned vehicle is off-course based on the current position and a planned path of the unmanned vehicle; generating, by the controller, a delay and a corrected path for the unmanned vehicle; communicating, by the controller, the delay and the corrected path to the companion unmanned vehicle; and controlling, by the controller, a movement of the unmanned vehicle such that the unmanned vehicle moves along the corrected path after the delay.

Some other embodiments are directed to an unmanned vehicle for use with a companion unmanned vehicle. The unmanned vehicle can include a position unit that is configured to determine a current position of the unmanned vehicle. The unmanned vehicle can also include a memory unit that is configured to store a planned path of the unmanned vehicle. The unmanned vehicle can further include a control unit disposed in communication with the position unit and the memory unit. The control unit is configured to determine that the unmanned vehicle is off-course based on the current position of the unmanned vehicle and the planned path assigned to the unmanned vehicle, generate a delay and a corrected path for the unmanned vehicle, communicate the delay and the corrected path to the companion unmanned vehicle, and control a movement of the unmanned vehicle such that the unmanned vehicle moves along the corrected path after the delay.

Yet other embodiments are directed to a system including multiple unmanned vehicles spaced from each other. The system including the unmanned vehicles, wherein each of the unmanned vehicles includes a position unit that is configured to determine a current position of the unmanned vehicle. The system including the unmanned vehicles, wherein each of the unmanned vehicle can also include a memory unit that is configured to store a planned path of the unmanned vehicle. The system including the unmanned vehicles, wherein each of the unmanned vehicle can also include a controller disposed in communication with each of the unmanned vehicle, wherein the controller is configured to receive the current position and the planned path of each of the unmanned vehicles, determine that at least one unmanned vehicle is off-course based on the current position and the planned path of each of the unmanned vehicles, generate a delay and a corrected path for the at least one unmanned vehicle, communicate the delay and the corrected path to each of the unmanned vehicles, and control a movement of the at least one unmanned vehicle such that the at least one unmanned vehicle moves along the corrected path after the delay.

In yet other embodiments, the position of an unmanned vehicle having a problem of any nature can be transmitted to a companion unmanned vehicle. The companion unmanned vehicle can then rely on the original planned path data of either or both unmanned vehicles during the time delay between the time that they received the notification from the vehicle experiencing the problem and the pre-determined or transmitted delay time.

As mentioned above, many current related art technologies (and even prospective future technologies) fail to account for requirements of a trajectory change with limited notice. For example, headwinds, storms, or other factors can cause a vehicle to deviate from its planned trajectory without notice, and the correction of such trajectories can occur nearly instantaneously. In these instances, a first-tier approach may be to automatically adopt a new course without regard to a current trajectory or the trajectories of neighboring vehicles.

Some of the disclosed embodiments address this problem by employing a tactic wherein the vehicle executes a delay from changing a first trajectory to a second trajectory. Each of these trajectories may also be referred to as planned paths. However, according to some embodiments, a vehicle may delay changing its trajectory immediately, allowing it to transmit its information to neighboring vehicles and permitting the neighboring vehicles to re-calculate their own new planned paths if warranted.

BRIEF DESCRIPTION OF THE DRAWINGS

The disclosed subject matter of the present application will now be described in more detail with reference to exemplary embodiments of the method, given by way of example, and with reference to the accompanying drawings, in which.

DETAILED DESCRIPTION OF EXEMPLARY ENVIRONMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Unmanned Vehicle

Figure 1:
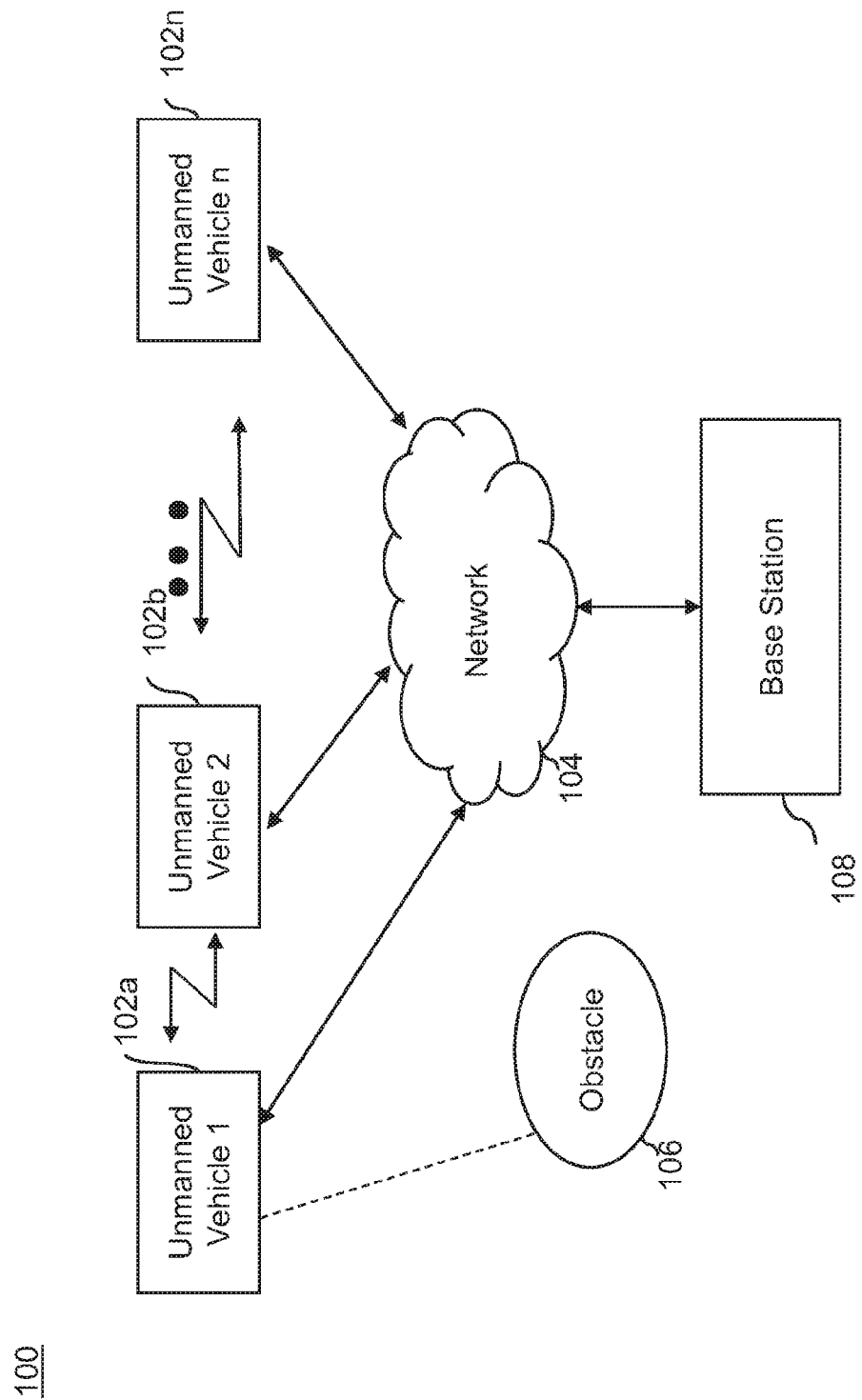
FIG. 1 is an exemplary system of unmanned vehicles or optionally manned vehicles in accordance with the disclosed subject matter.

FIG. 1 is an exemplary system of unmanned vehicles or optionally manned vehicles in accordance with the disclosed subject matter.

FIG. 1 illustrates the system 100 that includes unmanned vehicles 102a to 102n, hereinafter referred to as an unmanned vehicle 102 and collectively referred to as unmanned vehicles 102. The unmanned vehicle 102 illustrated in FIG. 1 is purely exemplary in nature, and embodiments are intended to include or otherwise cover any type of unmanned vehicle, including an unmanned or optionally manned aerial vehicle, an unmanned or optionally manned terrestrial vehicle, an unmanned or optionally manned oceanic or aquatic vehicle, an unmanned or optionally manned space vehicle etc. In fact, embodiments are intended to include or otherwise cover any type of unmanned or optionally manned vehicle that may stay geostationary in the sky and also fly at a considerable height. The unmanned vehicle 102 is merely provided for exemplary purposes, and the various inventive aspects are intended to be applied to any type of unmanned vehicle or optionally manned vehicle.

In some embodiments, the unmanned vehicle 102 can be manually controlled by a controller present at a base station 108. In some other embodiments, the unmanned vehicle 102 may be autonomously controlled based on a predetermined control strategy. In yet other embodiments, the unmanned vehicle 102 may be semi-autonomously controlled, which involves a controller entering and/or selecting one or more attributes and subsequent autonomous control of the unmanned vehicle 102 based on the entered and/or selected parameters. In fact, embodiments are intended to include or otherwise cover any type of techniques, including known, related art, and/or later developed technologies to control the unmanned vehicle 102.

For operating purposes, the unmanned vehicle 102 and its components can be powered by a power source to provide propulsion. The power source can be, but not restricted to, a battery, a fuel cell, a photovoltaic cell, a motor, a combustion engine, fossil fuel, solar energy and so forth. In fact, embodiments are intended to include or otherwise cover any type of power source to deliver sufficient power to the unmanned vehicle 102 to carry out its operations.

In some embodiments, the unmanned vehicle 102 can have, but not restricted to, rotors, propellers, and flight control surfaces that control movements and/or orientation of the unmanned vehicle 102. In fact, embodiments are intended to include or otherwise cover any other component that can control the movements and/or orientation of the unmanned vehicle 102.

Further, in some embodiments, the unmanned vehicle 102 can also include, but not restricted to, a processor (not shown), a memory (not shown), and the like. In some embodiments, the processor of the unmanned vehicle 102 can be a single core processor. In some other embodiments, the processor can be a multi-core processor that can be configured to run and/or execute software that is stored in a database. In alternative embodiments, the processor can be, but not restricted to, a general purpose processor, a Field Programmable Gate Array (FPGA), an Application Specific Integrated Circuit (ASIC), a Digital Signal Processor (DSP), and/or the like. Embodiments are intended to include or otherwise cover any type of processor, including known, related art, and/or later developed technologies to enhance capabilities of processing data and/or instructions. The memory can be used to store instructions that can be processed by the processor. Embodiments are intended to include or otherwise cover any type of memory, including known, related art, and/or later developed technologies to enhance capabilities of storing data and/or instructions.

The unmanned vehicle 102a to 102n may be a fleet of unmanned vehicles configured to communicate with each other, either directly or via a network 104 and the base station 108. In some embodiments, each of the unmanned vehicle 102 may be a companion unmanned vehicle of the other unmanned vehicles 102 in the fleet.

In some embodiments, the communication network 104 may include a data network such as, but not restricted to, the Internet, Local Area Network (LAN), Wide Area Network (WAN), Metropolitan Area Network (MAN), etc. In certain embodiments, the communication network 104 can include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In some embodiments, the communication network 104 may include or otherwise cover networks or subnetworks, each of which may include, for example, a wired or wireless data pathway. The communication network 104 may include a circuit-switched voice network, a packet-switched data network, or any other network capable for carrying electronic communications. For example, the network may include networks based on the Internet protocol (IP) or Asynchronous Transfer Mode (ATM), and may support voice usage, for example, VoIP, Voice-over-ATM, or other comparable protocols used for voice data communications. In one implementation, the network includes a cellular telephone network configured to enable exchange of text or SMS messages.

Examples of the communication network 104 may include, but are not limited to, a Personal Area Network (PAN), a Storage Area Network (SAN), a Home Area Network (HAN), a Campus Area Network (CAN), a Virtual Private Network (VPN), an Enterprise Private Network (EPN), Internet, a Global Area Network (GAN), and so forth. Embodiments are intended to include or otherwise cover any type of communication network, including known, related art, and/or later developed technologies to communicate with companion unmanned vehicle 102 or the base station 108.

In some embodiments, the network 104 can also include an ad-hoc network formed by the unmanned vehicles 102 such that the unmanned vehicles 102 can directly communicate with each other without an intermediary, such as the base station 108, a satellite, a cellular network etc.

The base station 108 can be a fixed base station or a mobile base station. In some other embodiments, the mobile base station may include, but not restricted to, an unmanned aerial vehicle, an unmanned terrestrial vehicle, and the like. It may also be contemplated that the base station 108 may be, but not restricted to, an electronic device, such as a smartphone, a laptop, a remote control device, and the like. In fact, embodiments are intended to include or otherwise cover any type of base station, including known, related art, and/or later developed technologies to communicate with other unmanned vehicles 102.

In the exemplary system each unmanned vehicle 102 has a planned path, that may be specified between two positions to optimize desired operations to be performed by the unmanned vehicle 102. For example, the planned path for the unmanned vehicle 102 can be considered as the path specified between two positions, such as position A and position B. In case of round trips, position A may coincide with position B.

In some other embodiments, the planned path can be segmented between multiple points such as, position A to site 1, site 1 to site 2, site 2 to position B and the like. The planned path can be determined based on various factors which include, but not restricted to, fuel level, wind speed, distance and so forth. In some other embodiments, the planned path can be calculated on the basis of a desired objective to be accomplished which includes, but not restricted to, stealth, surveillance, tracking, inspection, and the like. In alternate embodiments, one of the unmanned vehicles 102 can generate its own planned path upon receiving planned path information from any other unmanned vehicle 102 to avoid collision with each other and/or with obstacle 106.

In some embodiments, a controller of the unmanned vehicle 102 can be configured to generate the planned path using a plurality of parameters which includes, but not restricted to a starting position, current position of the companion unmanned vehicles 102, pre-stored planned path data, destination, map or topological data and the like.

In some embodiments, a single unmanned vehicle 102 may communicate its planned path to the companion unmanned vehicles 102 so that the companion unmanned vehicles 102 may generate their respective planned paths based on the planned path of the single unmanned vehicle 102. For example, the unmanned vehicle 102a can transmit the planned path associated with it to the other unmanned vehicle 102b to 102n, in order to enable the other unmanned vehicles 102b to 102n to consider the planned path when generating their respective planned paths. In other embodiments, each of the unmanned vehicles 102 may independently generate their respective planned paths and consequently share their planned paths among each other. In such instances, the neighboring or companion unmanned vehicles 102b to 102n may rely on their current planned paths and/or the known planned path(s) of the unmanned vehicle 102a that has calculated a new planned path for a pre-determined or transmitted duration of time before changing course to a new planned path.

Further, each of the unmanned vehicles 102 may modify their planned paths based on the planned paths of the other unmanned vehicles 102 in order to avoid or impede collisions. In further embodiments, the base station 108 transmits data required to generate the planned path for each of the unmanned vehicles 102 and each of the unmanned vehicles 102 generates their own planned paths based on the data provided by the base station 108.

In some embodiments, the planned path may be stored in the memory of the unmanned vehicle 102. In other embodiments, the memory of the unmanned vehicle 102 can also store data used to correct an original planned path and/or to create a new planned path. In some embodiments, the data in the memory can include, but not restricted to, a speed profile of the planned path, an altitude profile of the planned path, a horizontal profile of the planned path, and so forth. The horizontal profile may include a series of locations (latitude and longitude) disposed on the planned path.

The planned path can include a series of positions, speeds, altitudes, heading, and the like thereby linking each position with a corresponding speed, an orientation, an elevation, a heading and so forth. Moreover, if the mission is executed as planned, then the unmanned vehicle 102 travels along the planned path. However, in case of unexpected events, the unmanned vehicle 102 may veer off-course. Unexpected events may include, but not restricted to, urgent problems such as presence of obstacles 106 in the planned path, non-urgent problems such as changes in wind patterns, rain, snow etc., and any changes in mission requirements.

Further, the unmanned vehicle 102 may be configured to detect an obstacle 106 in its planned path. In some embodiments, the obstacle 106 can be an object such as, but not restricted to, antennas, buildings, terrains, electric cables, trees, rocks, bodies of water, sand banks, coral, orbital debris, terrain features and so forth. In other embodiments, the obstacle 106 may be a mobile obstacle, such as a bird, an aircraft, and the like. In some other embodiments, the obstacle 106 can be, but not restricted to, regions in the operational environment of the unmanned vehicle 102 with unpredictable changes, such as gust of wind, a storm etc. In fact, embodiments of the disclosed subject matter are intended to include or otherwise cover any type of obstacle that can cause the unmanned vehicle 102 to drift from its planned path.

In other embodiments, the unmanned vehicle 102 may veer off-course due to hardware and/or software faults, for example, but not restricted to, a fault in its navigation system, a fault in its actuators that control its movement and orientation, and so forth.

In some embodiments, the unmanned vehicle 102 may carry out the detection of an obstacle 106 by a sensor. Examples of a sensor include, but not restricted to, infrared sensors, proximity sensors, ultrasonic sensors, and so forth. In some other embodiments, the unmanned vehicle 102 may carry out the detection of the obstacle 106 by capturing images of the obstacle 106 appearing in operational environment. In an exemplary scenario, the captured image of the obstacle 106 includes, but not restricted to, two dimensional (2D) images that can be combined to generate stereoscopic images. In another exemplary scenario, the captured images may be holographic images to determine structural parameters of the obstacle 106. Yet in some other embodiments, the obstacle detection may be carried out using radar or sonar detection. Further, the unmanned vehicle 102 can be configured to communicate about the obstacle 106 to the companion unmanned vehicles 102 via the network 104.

The unmanned vehicle 102 may detect that it has gone off-course by various methods. In an embodiment, the unmanned vehicle 102 may determine a planned position based on the planned path and the current position of the unmanned vehicle 102, and a difference between the planned position and the current position. The difference between planned position and the current position is compared with a threshold value, which is based on various parameters such as, but not restricted to, distance, angular orientation, and the like. Further, based on the comparison between the threshold value and the calculated difference, the unmanned vehicle 102 determines if it has to modify the planned path or generate a new planned path in order to avoid collisions, because of varying non-urgent reasons, or to achieve mission objectives. Moreover, the unmanned vehicle 102 may use the determined position data and the planned position data based on the planned path data to generate an alert that the unmanned vehicle 102 has deviated from the planned path. The alert may be transmitted to the companion unmanned vehicles 102 via the network 104.

In some other embodiments, the base station 108 and/or at least one companion unmanned vehicle 102 may detect that the unmanned vehicle 102 has veered off-course. The unmanned vehicle 102 may be unable to determine that it has gone off-course from its planned path due to various reasons, such as any hardware and/or software faults, damage to one or more components, and the like. The base station 108 and/or the at least one companion unmanned vehicle 102 may determine that the unmanned vehicle 102 has gone off-course by various methods, such as relative vehicle telemetry, ranging tones, and so forth. Alternatively, considerations such as hardware or electrical failures or indices of parameters such as, fuel levels, weather, etc., can cause the unmanned vehicle 102 to calculate a new trajectory.

In some embodiments, the unmanned vehicle 102 can generate a corrected path after determining that it has deviated from the planned path, or may simply do so in response to any number of system or environmental/operational issues. The corrected path may be the original planned path, a modification of the original planned path or a new planned path. Further, the unmanned vehicle 102 may determine a delay before travelling on the corrected path. In some embodiments, the delay may be a time delay. The unmanned vehicle 102 may start travelling on the corrected path after the time delay has elapsed.

In other embodiments, the unmanned vehicle 102 may also generate an intermediate path other than the corrected path. The intermediate path may bridge the current off-course position of the unmanned vehicle 102 with the corrected path. In an embodiment, the unmanned vehicle 102 may start travelling on the intermediate path after a time delay. Alternatively, the unmanned vehicle 102 may start travelling on the intermediate path without any time delay.

In some embodiments, the time delay and corrected path may be generated by a controller of the unmanned vehicle 102. In addition, the controller may then control the movement of the unmanned vehicle 102 along the corrected path. In some other embodiments, the corrected path and the delay may be communicated by the unmanned vehicle 102a to each of the companion unmanned vehicles 102.

In an embodiment, each of the companion unmanned vehicles 102 may modify its corresponding planned path in accordance with the corrected path and the delay information obtained from the unmanned vehicle 102 that is correcting its trajectory. In other embodiments, the companion unmanned vehicles 102 may re-calculate respective new planned paths in case of any potential vehicle to vehicle collisions and/or to meet any mission requirements. In yet other embodiments, the companion unmanned vehicles 102 may further modify their planned paths or re-calculate new planned paths based on the current position of each of the unmanned vehicles 102 of the system 100. In fact, embodiments are intended to include or otherwise cover any collaborative strategy implemented by a fleet of unmanned vehicles and/or optionally manned vehicles in order to modify their paths in response to at least one unmanned vehicle or an optionally manned vehicle of the fleet sharing a corrected path and a delay before correcting its trajectory.

Further, the functioning of the unmanned vehicle 102 is described in more detail below in conjunction with FIG. 2.

II. Functioning of the Unmanned Vehicle

Figure 2:
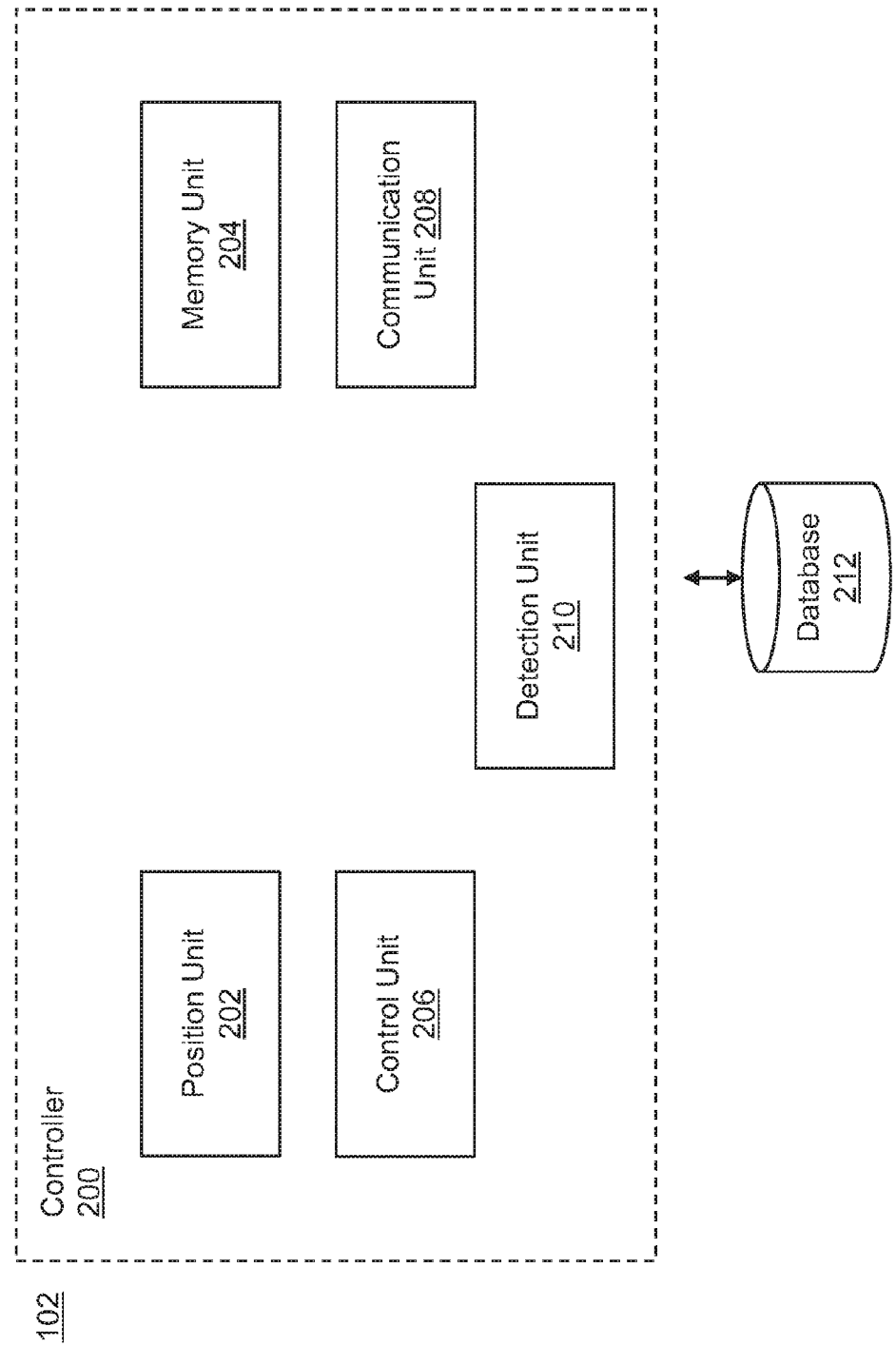
FIG. 2 illustrates components of the unmanned vehicle in accordance with the disclosed subject matter.

FIG. 2 illustrates components of the unmanned vehicle 102, in accordance with the disclosed subject matter. As discussed, the unmanned vehicle 102 can be configured to correct its trajectory based on a difference between its current position and a planned position based on its planned path. In some embodiments, the unmanned vehicle 102 can be further configured to determine a corrected path and a delay in order to correct its trajectory while also avoiding collisions with the companion unmanned vehicles 102.

In some embodiments, the unmanned vehicle 102 can be configured to include a controller 200 to operate one or more unmanned vehicles 102. The controller 200 may include, but not restricted to, different sub units such as a position unit 202, a memory unit 204, a control unit 206, a communication unit 208, and a detection unit 210 to carry out various operations. In fact, embodiments of the disclosed subject matter are intended to include or otherwise cover any number of components to carry out multiple operations, including, but not limited to, detecting obstacles, modifying or generating paths, generating a corrected path and a delay to correct its trajectory, communicating with other unmanned vehicles 102 and the base station 108, and travel on a predetermined path.

In an embodiment, the unmanned vehicle 102 can also be communicably coupled to a database 212 for retrieval of data and/or instructions required for carrying out operations. The database 212 can be stored on-board the unmanned vehicle 102 in the memory unit 204 or may be a remote database present in the base station 108 or one of the companion unmanned vehicles 102.

In some embodiments, the position unit 202 can be configured to determine a current position of the unmanned vehicle 102. The current position may include, but not restricted to, a current latitude, a current longitude, a current altitude, and a current heading of the unmanned vehicle 102. The position unit 202 can include, but not restricted to, a satellite navigation system such as a Global Positioning System (GPS), a Global Navigation Satellite System (GNSS), an inertial navigation system, an altimeter and the like. In an embodiment, the position unit 202 can be configured to determine the current position of the unmanned vehicle 102 based on satellite navigation data (e.g., GPS data), inertial navigation data, or a combination thereof.

In some embodiments, the position unit 202 can be configured to determine the current position of the unmanned vehicle 102 with the help of relative vehicle telemetry. Relative vehicle telemetry can include sharing of vehicle telemetry data among the unmanned vehicles 102 of the system 100. The vehicle telemetry data can include data from various sensors of the unmanned vehicle 102 including data from the altimeter, inertial navigation data, GPS data, etc. The position unit 202 can determine the position of the unmanned vehicle 102 relative to the companion unmanned vehicle 102 by comparing its telemetry data with the telemetry data obtained from the companion unmanned vehicles 102. Further, the communication unit 208 may be used for transmitting and receiving telemetry data.

In other embodiments, the position unit 202 can determine the current position of the unmanned vehicle 102 by using ranging tones. Ranging tones can be in the form of maximal or optimal codes, and usually consist of a long sequences of bits that may be generated by Linear Feedback Shift Registers (LFSR's). Ranging tones are pseudo-random, and resemble white noise unless the pattern sequence is known beforehand. Ranging tones have cyclical patterns or codes, and can be varied based on configurations of the LFSR's and their initial values. Ranging tones may include hundreds, thousands, or more bits and appear to be random, which may prevent the ranging tones from interfering in any appreciable way with local wireless traffic, or from being detected by correlation operations. However, by knowing the cyclic code, identification of a code transmitted to a companion unmanned vehicle 102 which relays the code signal back, is possible. Even though the sequence of bits received from the companion unmanned vehicle 102 appears random, the chances of the code being actual noise are almost negligible because of the precise cyclical nature of the code. For example, the code can be 1,2,3,4,1,2,3,4 and so on. If the same code is received, it is a result from the first transmission of this code. In some embodiments, the position unit 202 may use the communication unit 208 for transmission of the code and reception of the code from the companion unmanned vehicles 102. Therefore, the method of ranging tones basically involve applying the principle of echolocation on pseudo-random digital signals.

Upon receiving the code via the communication unit 208, the position unit 202 may use various parameters, such as, the speed of light, and a time required to receive the code starting from the time of transmission, in order to determine a distance travelled in the interim. The position unit 202 may further use the altitudes of both unmanned vehicles 102, and the time taken by a ranging tone to reach the unmanned vehicle 102, in order to determine a relative distance between the unmanned vehicle 102 and the companion unmanned vehicle 102.

The unmanned vehicle 102 in coordination with the companion unmanned vehicle 102 may implement alternative schemes to determine relative position based on ranging tones. In an embodiment, the companion unmanned vehicle 102 can transmit the received code after a predetermined duration. The predetermined duration may be based on a time required for the companion unmanned vehicle 102 to process and relay the received code. In an example, the companion unmanned vehicle 102 may require 100 ms to process and relay the received code. Therefore, the predetermined duration may be 200 ms to ensure completion of the processing and relay of the code. Further, the position unit 202 can determine the distance between the unmanned vehicle 102 and the companion unmanned vehicle 102 based on the time between transmission and reception of the code, the predetermined duration and speed of light. In the present example, the position unit 202 may deduct 200 ms (the predetermined duration) from the total time between transmission and reception to determine the time required for the code to travel to and from the companion unmanned vehicle 102. Therefore, the distance can be calculated based on half of the travel time of the code and speed of light.

In other embodiments, the position unit 202 may determine the current position of the unmanned vehicle 102 by various other techniques, such as optical imaging (for example, with cameras), RADAR detection, SONAR detection, and so forth. The position unit 202 may also include appropriate hardware to implement such methods.

In some embodiments, position unit 202 can be configured to determine the current position of the unmanned vehicle 102 based on location information stored in the database 212. The database 212 can be configured to store terrain data, such as United States Geological Survey (USGS) terrain data, which can be used in conjunction with telemetry data, ranging tones and other navigation data to determine the current position, modify the planned path, generate dynamic or new planned paths etc.

In some embodiments, the memory unit 204 can be configured to store planned path data of the unmanned vehicle 102. Moreover, the memory unit 204 can also be configured to store data for modifying the original planned path. In other embodiments, the memory unit 204 can be configured to store data for calculating a new planned path and/or an intermediate path. The data may include, but is not restricted to, a speed profile of the planned path, a horizontal profile (i.e., latitudes, longitudes) of the planned path, an altitude profile of the planned path, heading data, and so forth.

Further, the memory unit 204 may be, but is not restricted to, a Random Access Memory (RAM) unit and/or a non-volatile memory unit such as a Read Only Memory (ROM), optical disc drive, magnetic disc drive, flash memory, Electrically Erasable Read Only Memory (EEPROM), and so forth.

In alternate embodiments, the memory unit 204 can be configured to store videos and/or motion images of the obstacle 106 along with the path details. For example, the memory unit 204 may store an image of a skyscraper in the operational environment of the unmanned vehicle 102. In fact, embodiments of the disclosed subject matter are intended to include or otherwise cover any type of memory unit 204, including known, related art, and/or later developed technologies to facilitate storage of data required to carry out various operations of the unmanned vehicle 102.

In some embodiments, the communication unit 208 can be configured to receive the planned path of the companion unmanned vehicles 102 such that the control unit 206 can generate a delay based on the planned path of the companion unmanned vehicles 102 and a current position of the unmanned vehicle 102. Additionally, the communication unit 208 can be configured to establish communication between the unmanned vehicle 102 and the base station 108.

In an embodiment, the communication unit 208 can include a receiver (not shown) for receiving signals and a transmitter (not shown) for transmitting signals. In alternative embodiments, the communication unit 208 can include a transceiver for both transmitting and receiving signals.

The communication unit 208 may use communication methods that can include radio communications based on any frequency spectrum (e.g., Very High Frequency (VHF) or Ultra-High Frequency (UHF)) and any supporting infrastructure (e.g., cell phone towers.). In some embodiments, the unmanned vehicle 102 can be configured to communicate directly with the companion unmanned vehicle 102 by establishing an ad-hoc point to point communication which allows neighboring vehicles to share information without any intermediary source (such as a base station, etc.). In fact, embodiments of the disclosed subject matter are intended to include or otherwise cover any type of techniques, including known, related art, and/or later developed technologies to transmit and receive the information regarding positional and path information of the unmanned vehicle 102 and/or of an obstacle 106.

In some embodiments, the detection unit 210 can be configured to detect impending collision of the unmanned vehicle 102 with the obstacle 106 and/or the companion unmanned vehicles 102 in the vicinity by employing various sensors. The detection unit 210 can include, but not restricted to, infrared sensors, proximity sensors, ultrasonic sensors, and the like. In some other embodiments, the detection unit 210 can include one or more cameras to capture images of the obstacle 106 and generate stereoscopic images by using the captured images. Yet in some other embodiments, the detection unit 210 can be configured to generate holographic images of the obstacle 106. In some embodiments, the detection unit 210 can include optical sensors in order to detect the obstacle 106 based on an amount of reflected light from the obstacle 106.

In some embodiments, the detection unit 210 can be configured to detect and/or determine the structural parameters of the obstacle 106 using captured images. The structural parameters may be, but are not restricted to, shape, dimensions, and so forth, of the obstacle 106. The detection unit 210 can also determine a position of the obstacle 106 relative to the unmanned vehicle 102. In some embodiments, the detection unit 210 can be configured to use RADAR detection and/or SONAR detection to determine the relative position of the obstacle 106. Further, the detection unit 210 may communicate various details of the obstacle 106, such as the dimensions, shape and relative distance, to the control unit 206 such that the control unit 206 can determine if there is a possibility of a collision between the unmanned vehicle 102 and the obstacle 106. The control unit 206 can further modify a trajectory of the unmanned vehicle 102 in order to avoid a collision with the obstacle 106. The communication unit 208 can also communicate the details of the obstacle 106 to the companion unmanned vehicles 102 such that the companion unmanned vehicles 102 can take any evasive action, if necessary, to avoid collisions with the obstacle 106.

In other embodiments, the detection unit 210 can further track the obstacle 106 in case the obstacle 106 is mobile, for example, a bird, an aircraft, and the like. Further, the control unit 206 may iteratively modify the trajectory of the unmanned vehicle 102 based on the tracked position of the obstacle 106.

In fact, embodiments of the disclosed subject matter are intended to include or otherwise cover any type of detecting equipment, including known, related art and/or later developed technologies to detect and/or track an obstacle in the operational environment of the unmanned vehicle 102.

In certain embodiments, the detection unit 210 can be configured to detect and track a target as part of a mission objective of the system 100 of the unmanned vehicles 102.

In some embodiments, the control unit 206 can be disposed in communication with the position unit 202, the memory unit 204, the detection unit 210 and the communication unit 208. The control unit 206 can be configured to interface with and coordinate the operations of the various sub-units of the unmanned vehicle 102. The control unit 206 may also be configured to control various actuators (e.g., propellers, flight control surfaces etc.) of the unmanned vehicle 102 in order to control a movement and/or orientation of the unmanned vehicle 102.

In an embodiment, the control unit 206 or the controller 200 can be configured to determine if the vehicle 102 is off-course based on the current position of the unmanned vehicle 102 and the planned path assigned to the unmanned vehicle 102. In some embodiments, the control unit 206 or the controller 200 can be configured to determine the planned position of the unmanned vehicle 102 based on the planned path. The planned position may be an expected position of the unmanned vehicle 102 based on the planned path. In an example, the control unit 206 or the controller 200 may determine a time elapsed from the start of travel along the planned path, and determine the planned position based on the planned position data and the elapsed time.

In some embodiments, the control unit 206 or the controller 200 can be configured to determine the planned position of the unmanned vehicle 102 based on the planned path stored in memory unit 204, compare the planned position with the current position of the unmanned vehicle 102 and determine that the vehicle is off-course based on the comparison. Specifically, the control unit 206 or the controller 200 can be configured to determine a difference between the planned position and the current position and determine that the unmanned vehicle 102 is off-course if a value of the difference exceeds a tolerance value. The tolerance value may be determined based on distance, velocity, heading, and so forth. Yet in some other embodiments, the control unit 206 or controller 200 may also compare the current position of the unmanned vehicle 102 with the current position of at least one unmanned vehicle 102 to confirm deviation of the unmanned vehicle 102 from its planned path.

In some embodiments, the control unit 206 or the controller 200 may compare one or more parameters of the current position with equivalent parameters of the planned position. For example, the control unit 206 or the controller 200 may compare the current horizontal location, the current altitude and the current heading with the planned horizontal location, the planned altitude and the planned heading, respectively, of the unmanned vehicle 102. After computing the differences between the individual parameters, the control unit 206 or the controller 200 may ignore differences that are less than corresponding tolerance values. The tolerance values may be based on allowable instrument errors and are of magnitudes that are too low to interfere with the navigation of the unmanned vehicle 102. For example, the position unit 202 may be able to determine the current position of the unmanned vehicle 102 within an accuracy of 5 cm. Therefore, if the difference between the planned position and the current position to be less than 5 cm, the control unit 206 or the controller 200 may ignore the difference and consider the unmanned vehicle 102 to be travelling on the planned path.

In some embodiments, the unmanned vehicle 102 may also veer off-course due to various factors including a loss of incoming data transmissions (such as GPS signal, USGS terrain data, etc.), adverse environmental conditions (such as gust of wind, thundering, lightning, etc.), navigational anomalies, vehicle mechanics (engine, wings, wheels, blades, etc.), electronic systems or sub-systems, or failure of any maneuvering hardware component and/or circuitry of the unmanned vehicle 102.

In an embodiment, the control unit 206 or the controller 200 is configured to generate a delay and a corrected path for the unmanned vehicle 102. In certain embodiments, the control unit 206 or the controller 200 is configured to generate the corrected path based on at least the difference between the planned position and the current position of the unmanned vehicle 102. The corrected path may be the original planned path, a modification of the original planned path or a new planned path. The new planned path may include data equivalent to the data of the original planned path. For example, the new planned path data may include an altitude profile, a speed profile, a horizontal profile, and so forth. The new planned path data may further include a series of headings, one or more path segments. Further, the new planned path may be generated in a way such that an initial segment of the new planned path continues along the original planned path for a time delay.

In some embodiments, the control unit 206 or the controller 200 may compare the difference between the planned position and the current position with a threshold value, which is based on various parameters such as, but not restricted to, position, distance, angular orientation, and the like. Further, based on the comparison between the threshold value and the calculated difference, the control unit 206 or the controller 200 can determine if it has to modify the planned path or generate a new planned path in order to impede or avoid collisions and achieve the target. For example, if the unmanned vehicle 102 is slightly off-course, the corrected path may be the original planned path. Further, if the difference between the planned position and the current position is less than the threshold value but does not constitute a minor deviation, the corrected path may be a modification of the original planned path. Moreover, if the difference between the planned position and the current position is greater than the threshold value, the corrected path may be a new planned path. In an embodiment, the control unit 206 or the controller 200 may also generate the corrected path based on mission requirements assigned to the unmanned vehicle 102.

In other embodiments, the control unit 206 or the controller 200 is configured to generate the delay based on at least the planned paths of the companion unmanned vehicles 102 and the current position of the unmanned vehicle 102. The control unit 206 or the controller 200 may receive the planned path data of the companion unmanned vehicles 102 via the communication unit 208. Further, the control unit 206 or the controller 200 may determine future positions of the companion unmanned vehicles 102 based on their respective planned paths and generate the delay accordingly in order to avoid or impede any collision.

Moreover, in other embodiments, the control unit 206 or the controller 200 may receive the current position data of the companion unmanned vehicles 102 via the communication unit 208. The control unit 206 or the controller 200 may further compare the current position data of the companion unmanned vehicles 102 with their respective planned paths. Further, the control unit 206 or the controller 200 can be configured to generate the delay based on the comparison between the planned paths of the companion unmanned vehicles 102 with their respective current positions. This may enable the unmanned vehicle 102 to avoid or impede any collision in case one or more of the companion unmanned vehicles 102 have deviated from their respective planned paths.

In some embodiments, the delay can be a time period between determination that the unmanned vehicle 102 is off-course and commencement of travel on the corrected path. In other embodiments, the time delay may constitute an indefinite delay during which the control unit 206 or the controller 200 may wait for a response from one or more of the companion unmanned vehicles 102. During this period, the companion unmanned vehicles 102 may maneuver to avoid any collisions with the obstacle 106 and/or the unmanned vehicle 102. In further embodiments, the response from one or more of the companion unmanned vehicles 102 may also include an appropriate time delay for the unmanned vehicle 102. For example, the response may instruct the unmanned vehicle 102 to wait at its current position for a further time period and then move towards the corrected path. Alternatively, the response may instruct the unmanned vehicle 102 to immediately move towards the corrected path.

In certain embodiments, the time delay may be a predetermined time delay. The predetermined time delay may be a sufficiently long time period that is required for the companion unmanned vehicles 102 to adjust their trajectories to avoid collisions. In other embodiments, the time delay may be at least equal to or greater than a time duration required for the companion unmanned vehicles 102 to collaborate with each other and determine their respective new planned paths. In fact, embodiments are intended to include or otherwise cover any time delay that provides sufficient time to the companion unmanned vehicles 102 to respond to any sudden deviation in the trajectory of the unmanned vehicle 102 such that vehicle to vehicle collisions and/or collisions with the obstacle 106 can be avoided.

In other embodiments, the delay can include an intermediate path that bridges a distance or gap between the current position of the unmanned vehicle 102 and the corrected path. In further embodiments, the control unit 206 or the controller 200 is configured to generate the intermediate path based on at least the current position of the unmanned vehicle 102 and the corrected path. The intermediate path may be designed to avoid collisions with the companion unmanned vehicles 102 and/or the obstacle 106. In further embodiments, the intermediate path may be the shortest path required to return to the corrected path. In other embodiments, the controller 200 may generate the intermediate path based further on the current position of the unmanned vehicle 102, and the planned path of each of the companion unmanned vehicles 102 in order to avoid or impede any collisions. In yet other embodiments, the controller 200 may generate the intermediate path based further on the current position of each of the unmanned vehicles 102 of the system 100, and the planned path of each of the companion unmanned vehicles 102 in order to avoid or impede any collisions.

The intermediate path may include data equivalent to the data of any planned path of the unmanned vehicle 102. For example, the intermediate path data may include an altitude profile, a speed profile, a horizontal profile, and so forth. The intermediate path data may further include a series of headings, one or more path segments etc. It may also be contemplated that the intermediate path may include one or more intermediate time delays in order to avoid or impede collisions. The unmanned vehicle 102 may hover at positions corresponding to the intermediate time delays.

In other embodiments, the control unit 206 or the controller 200 may combine an initial time delay with the intermediate path. Specifically, the control unit 206 or the controller 200 may retain the unmanned vehicle 102 at its current position during the initial time delay and then commence travel on the intermediate path. The initial time delay may also be communicated by one of the companion unmanned vehicles 102.

The control unit 206 or the controller 200 is further configured to communicate the delay and the corrected path, via the communication unit 208, to the companion unmanned vehicles 102. The time delay and/or the intermediate path may provide sufficient time to the companion unmanned vehicles 102 to make any modifications to their paths, if required, to avoid or impede vehicle to vehicle collisions.

In some embodiments, the control unit 206 or the controller 200 can be configured to regulate one or more parameters of the unmanned vehicle 102 including, but not restricted to, a speed, a heading, a yaw angle and/or velocity, a roll angle and/or velocity, a pitch angle and/or velocity, an altitude, and the like, to implement the delay. For example, in case the delay is a time period, the controller 200 or the controller 200 may regulate the unmanned vehicle 102 to hover at its current position or encircle its current position before moving to the corrected path.

In addition, the control unit 206 or the controller 200 can be configured to control the movement and/or orientation of the unmanned vehicle 102 such that the unmanned vehicle 102 moves along the planned path, the corrected path and/or the intermediate path. In some embodiments, the control unit 206 or the controller 200 can control the movement and/or orientation of the unmanned vehicle 102 by regulating various actuators. For example, if the unmanned vehicle 102 is a rotorcraft, then the control unit 206 or the controller 200 can be configured to control the movement of the rotorcraft by controlling parameters such as, but not limited to, a pitch and a speed of rotor blades of each rotor, angle between the rotors, and the like. In an alternative example, if the unmanned vehicle 102 is a fixed-wing aircraft, then the control unit 206 or the controller 200 can be configured to control the movement of the fixed-wing aircraft by controlling parameters, such as, but not limited to, a thrust from a propeller, an angle or linear position of flight control surfaces, and the like.

In other embodiments, the control unit 206 or the controller 200 may guide the unmanned vehicle 102 along the planned path, the corrected path and/or the intermediate path by comparing the current position with the desired position of the unmanned vehicle 102, while taking into account tolerance errors of the various instruments on-board the unmanned vehicle 102. In certain embodiments, the control unit 206 or the controller 200 may guide the unmanned vehicle 102 along the planned path, the corrected path and/or the intermediate path by also considering positional data obtained from the companion unmanned vehicles 102.

In some embodiments, the control unit 206 or the controller 200 of the unmanned vehicle 102 may determine a new planned path to correct the course of the unmanned vehicle 102 such that the new planned path continues along the original planned path for a time delay before diverging from the original planned path. Therefore, the companion unmanned vehicles 102 may rely on the original planned path data of the unmanned vehicle 102 for navigation during the time delay. Further, the control unit 206 or the controller 200 may communicate, via the communication unit 208, the new planned path to the companion unmanned vehicles 102 and/or the base station 108 so that the companion unmanned vehicles 102 can generate revised paths, if required, based on the new planned path of the unmanned vehicle 102 during the time delay.

Though, in the description above, the control unit 206 or the controller 200 have been described as performing specific operations of the unmanned vehicle 102, the controller 200 or the control unit 206 can perform any additional functions pertaining to the unmanned vehicle 102. Further, the controller 200 can be an integral component with the various sub-units disposed therein. Alternatively, the various subs-units of the controller 200 may be discrete units communicably coupled to each other.

Though, in the description above, the control unit 206 or the controller 200 have been described as performing various operations of the unmanned vehicle 102, in other embodiments, the controller of the base station 108 can perform one or more of the above operations. Yet in some other embodiments, the controller 200 of one of the companion unmanned vehicles 102 can perform one or more of the above operations. In fact, embodiments of the disclosed subject matter are intended to include or otherwise cover any controller or processor that is operatively coupled to one or more of the unmanned vehicles 102 and can perform one or more of the above operations.

In some embodiments, the controller 200 of one of the unmanned vehicles 102 (for example, a leader unmanned vehicle 102) of the system 100 can receive the current position and planned path of each of the unmanned vehicles 102 of the system 100. Further, the controller 200 of the leader unmanned vehicle 102 can determine whether at least one unmanned vehicle 102 of the system 100 is off-course based on the planned path and the current position of each of the unmanned vehicles 102. The controller 200 of the leader unmanned vehicle 102 can also generate a delay and propose a corrected path for the at least one unmanned vehicle 102 that has deviated from its planned path. The controller 200 of the leader unmanned vehicle 102 can also communicate the delay and the corrected path to each of the unmanned vehicles 102 of the system 100. The controller 200 of the leader unmanned vehicle 102 can also generate an intermediate path based on at least the current position and the corrected path of the at least one unmanned vehicle 102.

Moreover, the controller 200 of the leader unmanned vehicle 102 can also determine the planned position of the at least one unmanned vehicle 102 based on the planned path; and generate the corrected path based on at least the difference between the planned position and the current position of the at least one unmanned vehicle 102.

The controller 200 of the leader unmanned vehicle 102 can also remotely control the movement of the at least unmanned vehicle 102 that has deviated from its planned path such that the at least one unmanned vehicle 102 moves along the corrected path after the delay. Further, the controller 200 of the leader unmanned vehicle 102 can control the movement of the at least one unmanned vehicle 102 such that the at least one unmanned vehicle 102 moves along the intermediate path during the delay. The controller 200 of the leader unmanned vehicle 102 can also control movements of the companion unmanned vehicles 102 (including itself) in order to impede or avoid collisions.

In some embodiments, the controller 200 of the leader unmanned vehicle 102 may determine a new planned path to correct the course of the at least one unmanned vehicle 102 such that the new planned path continues along the original planned path for a time delay before diverging from the original planned path. Further, the controller 200 of the leader unmanned vehicle may communicate, via the communication unit 208, the new planned path to the companion unmanned vehicles 102 and/or the base station 108 so that the companion unmanned vehicles 102 can modify their paths based on the new planned path of the at least one unmanned vehicle 102.

In other embodiments, the controller of the base station 108 may also perform one or more operations that are described above with reference to the controller 200 of the leader unmanned vehicle 102.

III. Operation of the Unmanned Vehicle

Figure 3:
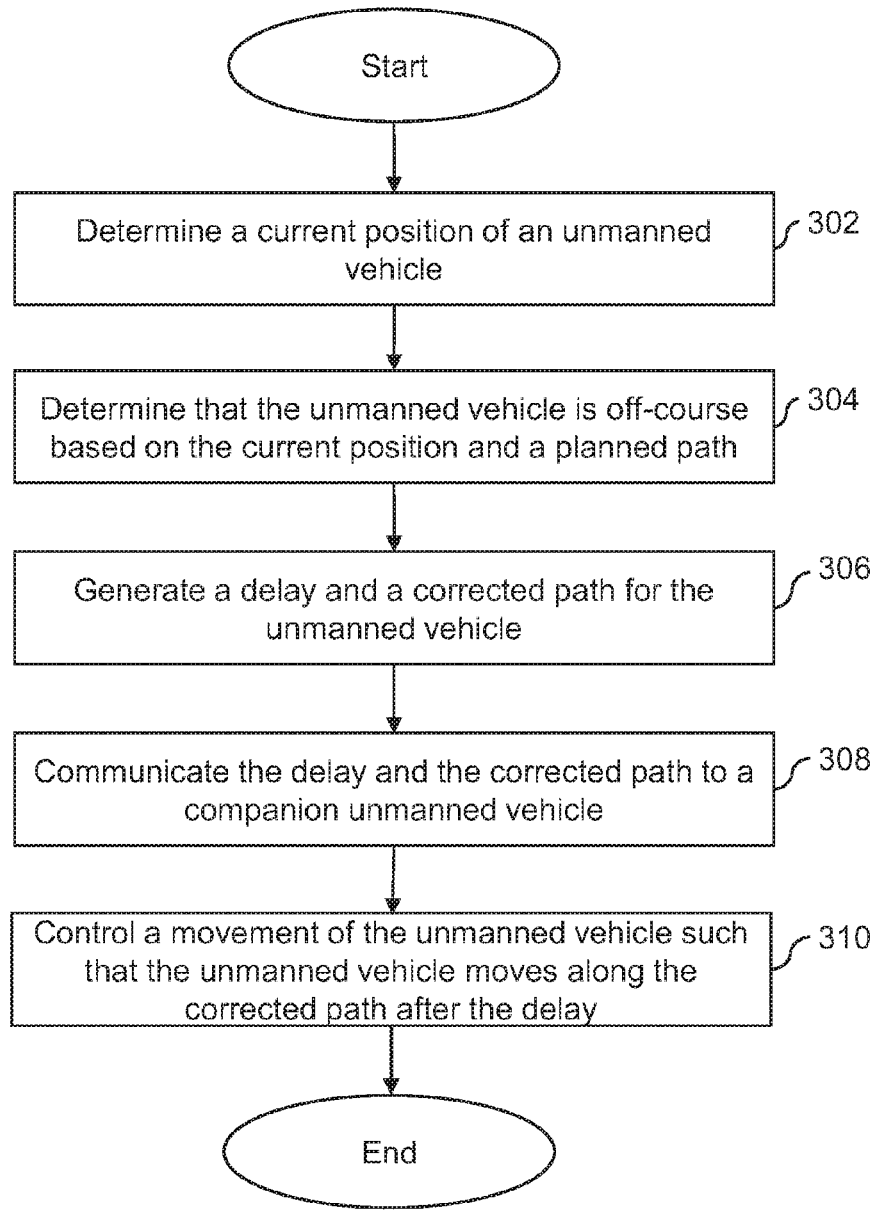
FIG. 3 is a flowchart of an exemplary procedure for controlling movement of unmanned vehicles in accordance with the disclosed subject matter.

FIG. 3 is a flowchart of an exemplary procedure 300 for controlling the movement of unmanned vehicles 102 in accordance with the disclosed subject matter. In some embodiments, the unmanned vehicle 102 can be an unmanned aerial vehicle. This flowchart is merely provided for exemplary purposes, and embodiments are intended to include or otherwise cover any methods or procedures for correcting a trajectory of an unmanned vehicle 102.

In accordance with the flowchart of FIG. 3, the controller 200 determines a current position of the unmanned vehicle 102 at step 302. In some embodiments, the current position data can include, but not restricted to, a current latitude, a current longitude, a current elevation, or any other form of data associated with the unmanned vehicle 102.

At step 304, the controller 200 determines that the unmanned vehicle 102 is off-course based on the current position and a planned path of the unmanned vehicle 102. The controller 200 may determine a planned position of the unmanned vehicle 102 based on the planned path. The controller 200 compares the planned position data based on the planned path with the current position data to determine that the unmanned vehicle 102 is off-course. In other embodiments, the controller 200 may generate a composite dataset based on the comparison between the current position and the planned position. The composite data set can include an array of values based on the difference between each of the parameters of the current position and corresponding parameters of the planned position.

At step 306, the controller 200 of the unmanned vehicle 102 generates a delay and a corrected path for the unmanned vehicle 102. In certain embodiments, the controller 200 generates the corrected path based on at least the difference between the planned position of the unmanned vehicle 102 and the current position of the unmanned vehicle 102. Moreover, the corrected path can be the original planned path, a modification of the original planned path or a new planned path distinct from the original planned path.

In other embodiments, the controller 200 receives the planned path of a companion unmanned vehicle 102 and then generates the delay based on at least the current position of the unmanned vehicle 102 and the planned path of the companion unmanned vehicle 102. The controller 200 controls the movement of the unmanned vehicle 102 during the delay in order to impede or avoid collision with the companion unmanned vehicle 102.

In some embodiments, the delay can be a time period between determination that the unmanned vehicle 102 is off-course and commencement of travel on the corrected path. The controller 200 may retain the unmanned vehicle 102 at its current position during the time period and then move the unmanned vehicle 102 on the corrected path after the time period has elapsed.

In other embodiments, the delay can include an intermediate path. The controller 200 generates the intermediate path based on at least the current position and the corrected path of the unmanned vehicle 102. Further, the controller 200 may generate the intermediate path based further on the current position and/or the planned path of each of the companion unmanned vehicle 102 in order to avoid or impede any collisions.

Further, at step 308, the controller 200 of the unmanned vehicle 102 communicates about the delay and the corrected path to the companion unmanned vehicle 102. The companion unmanned vehicle 102 can therefore consider the strategy of the unmanned vehicle 102 regarding its course correction and modify their respective trajectories accordingly such that any collisions can be avoided. The controller 200 may also communicate the current position of the unmanned vehicle 102 to the companion unmanned vehicles 102 such that the companion unmanned vehicles 102 can steer clear of the unmanned vehicle 102 during its course correction.

Next, at step 310, the controller 200 controls the movement of the unmanned vehicle 102 such that the unmanned vehicle 102 moves to the corrected path after the delay. The controller 200 may regulate one or more components that control a movement and/or orientation of the unmanned vehicle 102 such that the unmanned vehicle 102 may hover at a given position during a time delay or move along an intermediate path that leads to the corrected path. In some embodiments, an initial segment of the new planned path for the unmanned vehicle 102 may continue along the original planned path for the time delay. Further, the new planned path can diverge from the original planned path after the time delay.

Though the various steps of the procedure 300, as described above, have been implemented by the controller 200 of one of the unmanned vehicles 102, it may be contemplated that the controller of the base station 108 or the controller 200 of the leader unmanned vehicle 102 may perform one or more of the above steps.

Figure 4:
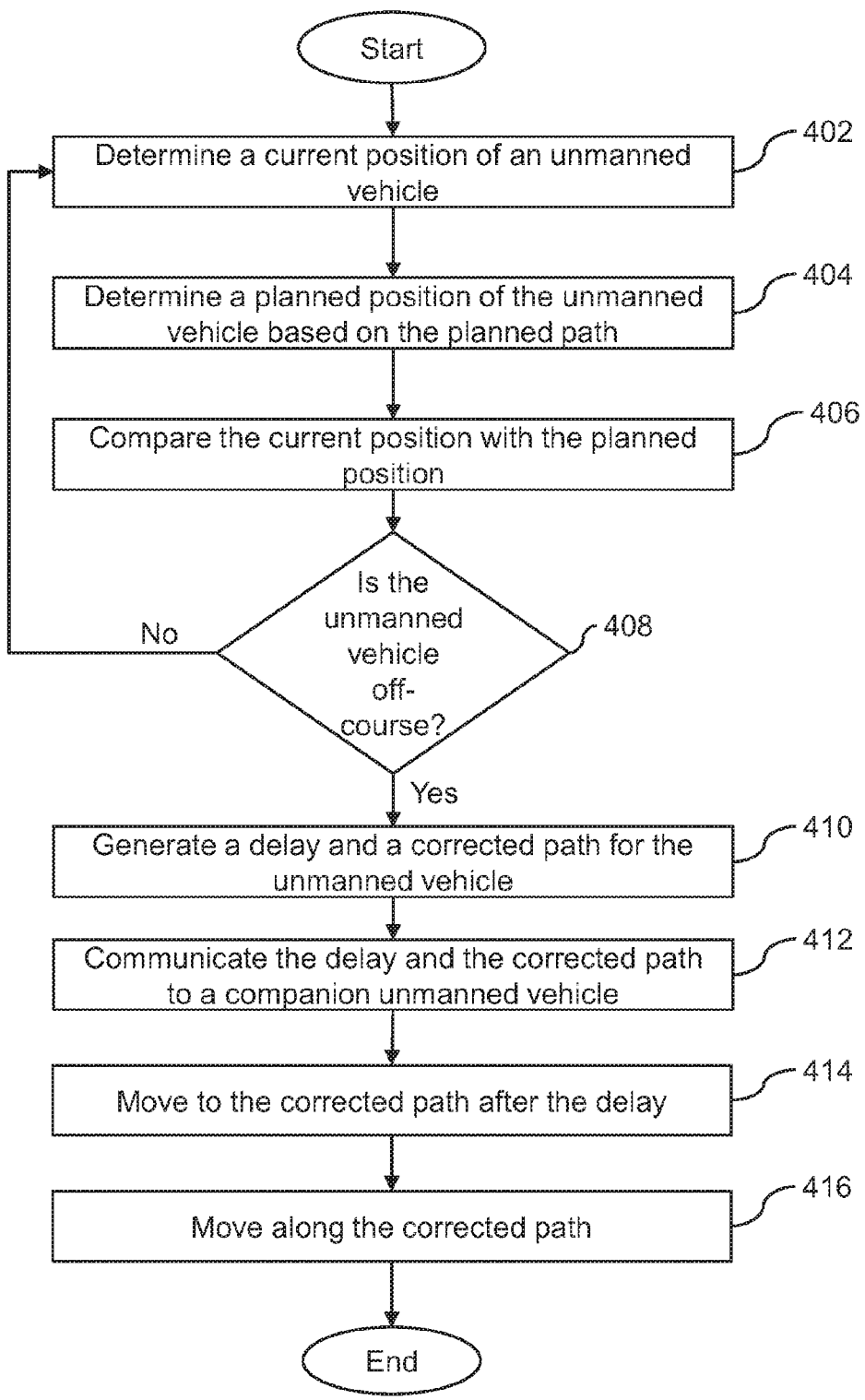
FIG. 4 is a flowchart of an exemplary procedure for controlling movement of unmanned vehicle in accordance with the disclosed subject matter.

FIG. 4 is a flowchart of an exemplary procedure 400 for controlling movement of unmanned vehicle 102 in accordance with the disclosed subject matter. This flowchart is merely provided for exemplary purposes, and embodiments are intended to include or otherwise cover any methods or procedures for correcting a trajectory of an unmanned vehicle 102.

In accordance with the flowchart of FIG. 4, the controller 200 determines the current position of the unmanned vehicle 102 at step 402. Further, at step 404, the controller 200 of the unmanned vehicle 102 determines the planned position of the unmanned vehicle 102 based on the planned path.

Moreover, at step 406, the controller 200 compares the current position of the unmanned vehicle 102 with the planned position of the unmanned vehicle 102. At step 408, the controller 200 determines whether the unmanned vehicle 102 is off-course. The controller 200 can determine if the unmanned vehicle 102 is off-course based on the comparison between the planned position and the current position of the unmanned vehicle 102. In fact, embodiments of the disclose subject matter are intended to include or otherwise cover any type of techniques and/or systems to determine if the unmanned vehicle 102 has deviated from its planned path or planned position.

In a case where the controller 200 determines that the unmanned vehicle 102 has deviated from its planned position, the procedure 400 proceeds to step 410. If the controller 200 determines that unmanned vehicle 102 has not deviated from its planned position, then the procedure 400 returns to the step 402 and continues comparing the current position of the unmanned vehicle 102 with the planned position of the unmanned vehicle 102. The controller 200 may periodically compare the current position with the planned position until a mission objective or target is achieved.

Next, at the step 410, the controller 200 of the unmanned vehicle 102 generates the delay and the corrected path for the unmanned vehicle 102 based on at least the difference between the current position of the unmanned vehicle 102 and the planned position of the unmanned vehicle 102.

In some embodiments, the controller 200 can be configured to generate an intermediate path based on at least the current position of the unmanned vehicle 102 and the corrected path for the unmanned vehicle 102. Further the controller 200 controls the movement of the unmanned vehicle 102 such that the unmanned vehicle 102 moves along the intermediate path during the delay. The unmanned vehicle 102 moves along the intermediate path which serves as a bridge between the deviated position and the corrected path. In some other embodiments, the intermediate path may include a circular path to impede collision with the obstacle 106 and/or with the companion unmanned vehicle 102. In fact, embodiments of the disclose subject matter are intended to include or otherwise cover any type of techniques and/or systems to generate an intermediate path in order to guide the unmanned vehicle 102 to the corrected path while avoiding any collisions with the companion unmanned vehicles 102 and/or the obstacle 106.

Further, at step 412, the controller 200 of the unmanned vehicle 102 communicates the delay and the corrected path to the companion unmanned vehicles 102.

Next at step 414, the controller 200 of the unmanned vehicle 102 controls the movement of the unmanned vehicle 102 such that the unmanned vehicle 102 moves to the corrected path after the delay. In some embodiments, the controller 200 can control the movement of the unmanned vehicle 102 such that the unmanned vehicle 102 moves along the original planned path during the time delay. After the time delay has elapsed, the unmanned vehicle 102 may change its path to the new planned path or the corrected path which is different from the original planned path. In an embodiment, the new planned path or the corrected path may be generated such that the initial segment overlaps with the original planned path for the duration of the time delay. Moreover, the controller 200 may guide the unmanned vehicle 102 along the corrected path until the mission objective or the target is achieved.

Though the various steps of the procedure 400, as described above, have been implemented by the controller 200 of one of the unmanned vehicles 102, it may be contemplated that the controller of the base station 108 or the controller 200 of the leader unmanned vehicle 102 may perform one or more of the above steps.

IV. Exemplary Embodiments

An exemplary operation of the system 500 will be now described with reference to FIGS. 5A, 5B and 5C. The system 500 includes the unmanned vehicles 102a to 102n (hereinafter collectively referred to as "the unmanned vehicles 102") that are deployed from a source 502. The source 502 may be base station 108 or any other suitable location. In some embodiments, the unmanned vehicles 102 can also be independently deployed from multiple locations. After deployment, the unmanned vehicles 102 may communicate with each other and autonomously form the system 500. Alternatively, the base station 108 may transmit information to each of the unmanned vehicles 102 required to form the system 500. After the system 500 is formed, a central platform or a leader vehicle can be dynamically selected among the unmanned vehicles 102. In the illustrated embodiment, the unmanned vehicle 102b acts as the leader unmanned vehicle that communicates with the base station 108 on behalf of the companion unmanned vehicles 102a, and 102c to 102n, and controls the collective behavior of the system 500 of unmanned vehicles 102. However, in alternative embodiments, each of the unmanned vehicles 102 can autonomously control its operations and cooperate with other unmanned vehicles 102 without any central platform or a leader unmanned vehicle.

Figure 5A:
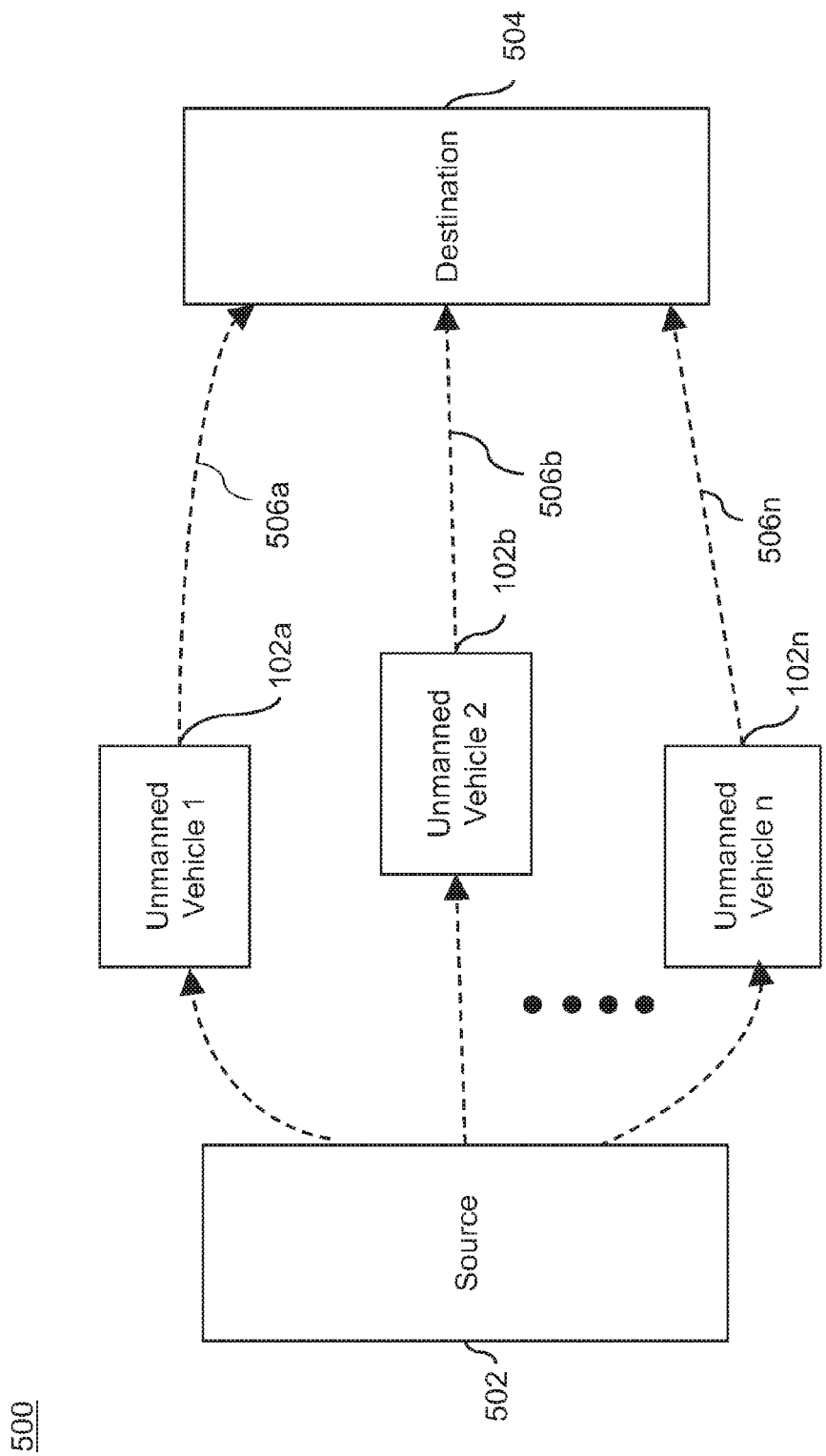
FIG. 5A is a schematic of unmanned vehicles travelling along planned paths in accordance with the disclosed subject matter.

FIG. 5A illustrates an exemplary scenario illustrating unmanned vehicles 102a to 102n moving along their respective planned paths 506a to 506n (hereinafter collectively referred to as "the planned path 506") from the source 502 to a destination 504. In case of a round trip, the destination 504 may coincide with the source 502. The planned paths 506a to 506n may be generated based on mission objectives and prevention of any collisions.

In an exemplary scenario, the unmanned vehicles 102a to 102n may form a vehicle swarm upon deployment or arrange themselves into different formations for various purposes including collision avoidance, energy conservation, safeguarding assets, etc. For example, the planned paths 506a to 506n may be generated such that the system 500 of unmanned vehicles 102a to 102n follow an energy efficient flying formation. In an embodiment, the unmanned vehicles 102 can autonomously arrange themselves in an energy efficient formation in order to conserve energy during flight. In an exemplary scenario, an energy efficient formation is a V-formation in which the unmanned vehicles 102 form a substantially V-shaped arrangement. The unmanned vehicle 102b acting as the leader unmanned vehicle may form the apex of the V-shape. The V-formation may reduce an induced drag on the unmanned vehicles 102, thereby reducing energy consumption. A distance and/or angle between the unmanned vehicles 102 may be dynamically changed based on ambient conditions to minimize energy consumption. Further, the unmanned vehicles 102 may periodically switch positions within the V-shape based on a remaining energy of each of the unmanned vehicles 102.

In another embodiment, the unmanned vehicles 102 can arrange themselves in a defensive formation to safeguard one or more assets. The assets can be an aircraft, a terrestrial vehicle, a ship, a stationary object (e.g., a communication tower or a building) etc.

The controller 200 of each of the unmanned vehicles 102 may use various methods, such as satellite navigation, relative vehicle telemetry, inertial navigation, ranging tones, optical imaging, stored terrain data, or a combination thereof in order to accurately navigate the unmanned vehicle 102 along its respective planned path 506.

Further, the controller 200 controls the movement of the unmanned vehicle 102 such that the unmanned vehicle 102 travels along the planned path 506, while avoiding or impeding collisions among the unmanned vehicles 102 and/or between the unmanned vehicles 102 and any obstacle.

Figure 5B:
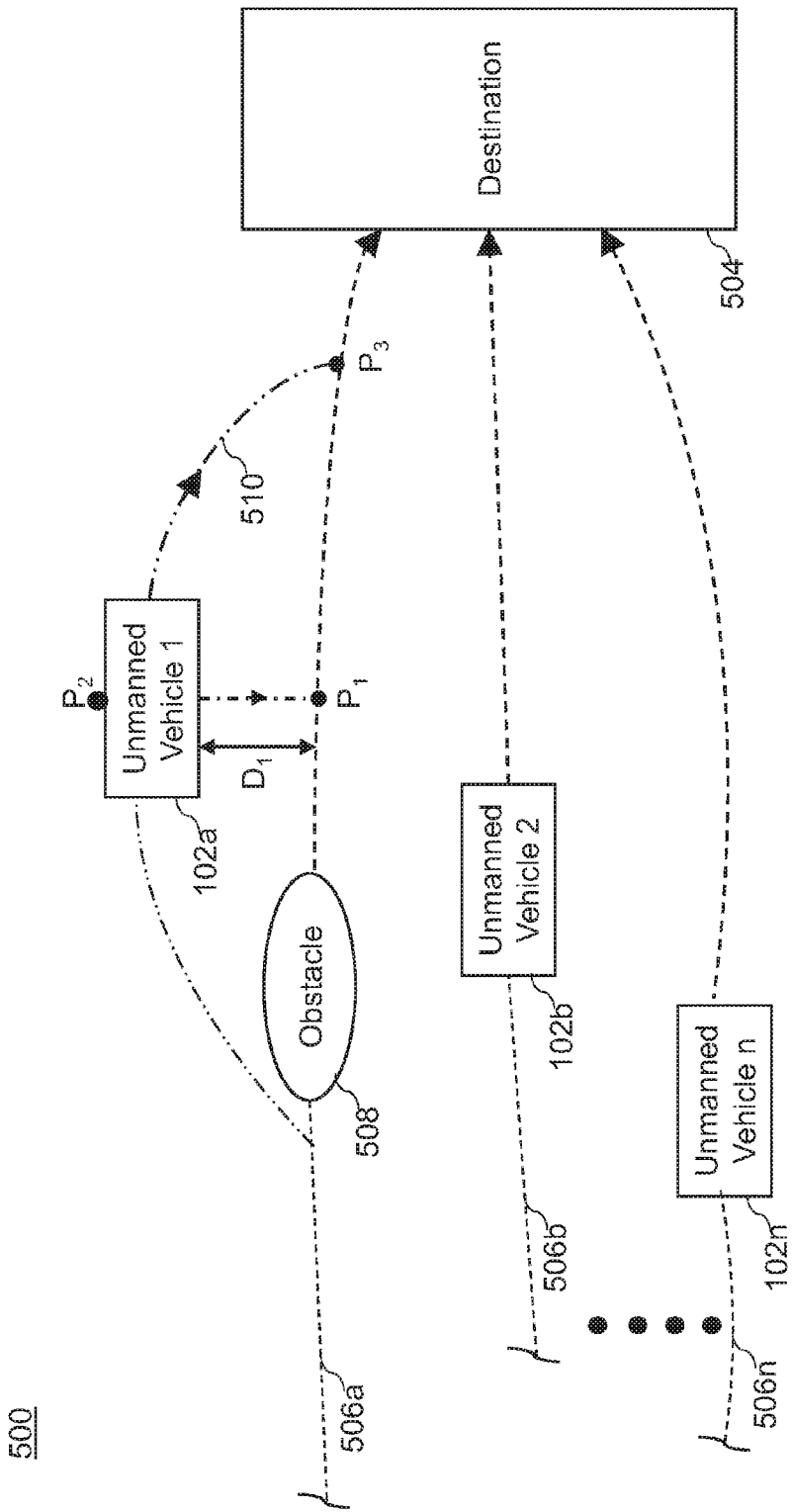
FIG. 5B is a schematic of at least one unmanned vehicle correcting its trajectory in accordance with the disclosed subject matter.

In FIG. 5B, the detection unit 210 of the unmanned vehicle 102a detects an obstacle 508 in its planned path 506a. The controller 200 of the unmanned vehicle 102a may then divert the unmanned vehicle 102a from its planned path 506a in order to avoid a collision with the obstacle 508. The obstacle 508 can be a mobile or stationary object. Alternatively, the obstacle 508 can be a region of adverse weather, such as a storm, rain, snow, and so forth.

Moreover, the controller 200 of the unmanned vehicle 102a can then determine that the unmanned vehicle 102a is off-course by comparing a planned position '$P_1$' based on the planned path data stored in memory unit 204 with the current position '$P_2$'. Specifically, the controller 200 may determine a difference between the planned position '$P_1$' and the current position '$P_2$'. In case the difference is greater than the tolerance value of the various navigation instruments of the unmanned vehicle 102a, the controller 200 may deduce that the unmanned vehicle 102a has deviated from its planned path 506a.

In an example, as illustrated in FIG. 5B, the controller 200 may determine the difference between the planned position '$P_1$' and the current position '$P_2$' as a distance '$D_1$' separating the planned position '$P_1$' and the current position '$P_2$'. In an embodiment, the distance '$D_1$' may be the distance between the planned position 'P1' and the current position '$P_2$' in three dimensional space. In another embodiment, the distance '$D_1$' may be the distance between horizontal locations (i.e., latitudes and longitudes) of the planned position '$P_1$' and the current position '$P_2$'. In yet another embodiment, the distance '$D_1$' may be a difference in altitudes between the planned position '$P_1$' and the current position '$P_2$'.

The controller 200 may then compare the distance '$D_1$' with an equivalent threshold value. In the exemplary scenario illustrated in FIG. 5B, the controller 200 may determine that the distance '$D_1$' is less than the threshold value. Since the distance '$D_1$' is less than the threshold value, the controller 200 may determine a corrected path for the unmanned vehicle 102a as the planned path 506a or a modification of the planned path 506a. The unmanned vehicle 102a may also communicate its current position '$P_2$' to the companion unmanned vehicles 102b to 102n so that all members of the system 500 are aware that the unmanned vehicle 102a has gone off-course and is going to correct its trajectory. Moreover, the unmanned vehicle 102a may also communicate various data regarding the obstacle 508 to the companion unmanned vehicles 102b to 102n such that the companion unmanned vehicles 102b to 102n can take appropriate actions to avoid collisions with the obstacle 508. Such data regarding the obstacle 508 may include a position of the obstacle 508, dimensions and/or shape of the obstacle 508, a trajectory of the obstacle 508 if it is mobile, and so forth.

In an embodiment, the controller 200 may further generate a time delay '$\Delta T_1$' based on various parameters, for example, the difference '$D_1$', current positions of the companion unmanned vehicles 102b to 102n, planned paths 506b to 506n of the companion unmanned vehicles 102b to 102n, and so forth. In an embodiment, each of the companion unmanned vehicles 102b to 102n may communicate their respective current positions and planned paths 506b to 506n to the unmanned vehicle 102a. In an alternative embodiment, the leader unmanned vehicle 102b may communicate the above data to the unmanned vehicle 102a on behalf of the other unmanned vehicles 102c to 102n. The time delay '$\Delta T_1$' may be determined such that any collision with the companion unmanned vehicles 102b to 102n can be avoided. The time delay '$\Delta T_1$' may also provide the companion unmanned vehicles 102b to 102n with sufficient response time to avoid any collision with the obstacle 508 and modify their paths, if necessary.

In other embodiments, the controller 200 may retain the unmanned vehicle 102a at its current position '$P_2$' for an indefinite period after detecting that the unmanned vehicle 102a is off-course. In various embodiments, the unmanned vehicle 102a may hover at its current position '$P_2$' or encircle the current position '$P_2$' with a small radius. Further, the unmanned vehicle 102a may wait for a response from at least one of the companion unmanned vehicles 102b to 102n. In an example, the leader unmanned vehicle 102b may communicate the time delay '$\Delta T_1$' to the unmanned vehicle 102a after the unmanned vehicle 102a has waited at its current position '$P_2$'. In an embodiment, the companion unmanned vehicles 102b to 102n may have already corrected their paths, if necessary, to avoid any potential collisions. Further, the leader unmanned vehicle 102b may communicate a corrected path to the unmanned vehicle 102a taking into account the path modifications of the companion unmanned vehicles 102b to 102n.

In an embodiment, the unmanned vehicle 102a may directly move to the planned position '$P_1$' on the planned path 506a after the time delay '$\Delta T_1$' has elapsed. Alternatively, the unmanned vehicle 102a may move to the planned path 506a by the shortest possible route after the time delay '$\Delta T_1$' has elapsed. Subsequently, the unmanned vehicle 102a may move along the planned path 506a to the destination 504.

In other embodiments, the unmanned vehicle 102a may determine an intermediate path 510 that bridges a gap between the current position '$P_2$' and the planned path 506a while avoiding any collisions with the companion unmanned vehicles 102b to 102n and the obstacle 508. The controller 200 of the unmanned vehicle 102a may generate the intermediate path 510 based on the planned paths 506b to 506n of the companion unmanned vehicles 102b to 102n and/or current positions of the companion unmanned vehicles 102b to 102n. Alternatively, the leader unmanned vehicle 102b may communicate the intermediate path 510 to the unmanned vehicle 102a. In FIG. 5B, the intermediate path 510 may intersect the planned path 506a at position '$P_3$'. However, in other embodiments, the intermediate path 510 may also be the shortest route between the current position '$P_2$' and the planned path 506a.

The unmanned vehicle 102a may immediately start moving along the intermediate path 510, and then subsequently move along the planned path 506a towards destination 504. Alternatively, the unmanned vehicle 102a may wait at its current position '$P_2$' for a time delay '$\Delta T_2$' and then subsequently move along the intermediate path 510.

In certain embodiments, the controller at the base station 108 may also generate the time delays '$\Delta T_1$', '$\Delta T_2$', and the intermediate path 510, and coordinate operations of the unmanned vehicles 102a to 102n of the system 500.

Figure 5C:
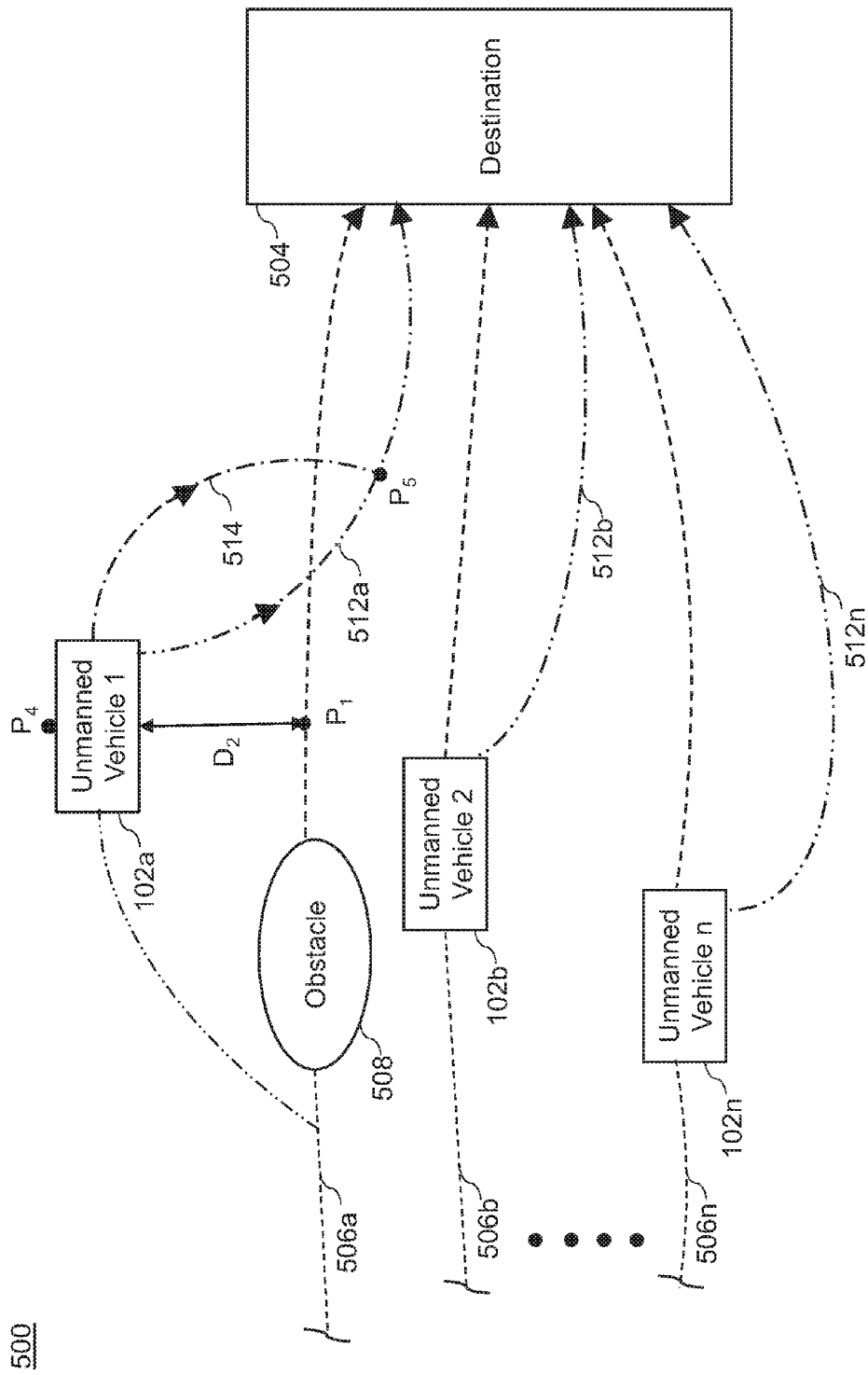
FIG. 5C is a schematic of at least one unmanned vehicle correcting its trajectory and moving to a new planned path in accordance with the disclosed subject matter.

FIG. 5C illustrates an exemplary scenario illustrating the unmanned vehicle 102a deviated from its planned path 506a to a current position '$P_4$'. The controller 200 of the unmanned vehicle 102a determines that a distance '$D_2$' between the current position '$P_4$' and the planned position '$P_1$' is greater than the threshold value. As a result, the controller 200 of the unmanned vehicle 102a proposes a corrected path 512a distinct from the planned path 506a. Therefore, the corrected path 512a can be a new planned path for the unmanned vehicle 102a. The corrected path 512a may be generated based on the distance '$D_2$' between the current position '$P_4$' and the planned position '$P_1$', current positions and/or planned paths 506b to 506n of the companion unmanned vehicles 102b to 102n, mission objectives, and so forth. The unmanned vehicle 102a may then communicate the corrected path 512a to the companion unmanned vehicles 102b to 102n such that the companion unmanned vehicles 102b to 102n can determine respective new planned paths 512b to 512n in order to avoid collisions and also achieve mission objectives. The corrected path 512a and the new planned paths 512b to 512n may also be generated such that the unmanned vehicles 102a to 102n of the system 500 can fly in a formation with adequate spacing, such as a V-formation.

In other embodiments, the unmanned vehicle 102a may communicate to the companion unmanned vehicles 102b to 102n that it has gone off-course, and therefore requires course correction. The unmanned vehicle 102a may wait for an indefinite period at the current position '$P_4$' for a response from any one of the companion unmanned vehicles 102b to 102n. The leader unmanned vehicles 102b may determine the corrected path 512a for the unmanned vehicle 102a upon receiving current position data of the unmanned vehicle 102a. Further, each of the unmanned vehicles 102b to 102n may also determine their respective new planned paths 512b to 512n before the leader unmanned vehicle 102b communicates the corrected path 512a to the unmanned vehicle 102a.

In an embodiment, the unmanned vehicle 102a may wait at the current position '$P_4$' for a time delay '$\Delta T_3$' before moving directly along the corrected path 512a. The time delay '$\Delta T_3$' can be generated by the controller 200 of the unmanned vehicle 102a or may be communicated to the unmanned vehicle 102a by the leader unmanned vehicle 102b.

In other embodiments, the controller 200 may generate the corrected path 512a such that an initial segment (not shown) of the corrected path 512a overlaps with the original planned path 506a for the duration of the time delay '$\Delta T_3$'. Therefore, the unmanned vehicle 102a may travel along the original planned path 506a during the time delay '$\Delta T_3$' before changing its path to the corrected path 512a. The unmanned vehicles 102b- to 102n may therefore rely on the data related to the original planned path 506a of the unmanned vehicle 102a during the time delay '$\Delta T_3$' for navigation, and thereby avoiding any collisions. Further, the unmanned vehicles 102b- to 102n may also receive data regarding the corrected path 512a from the unmanned vehicle 102a, and can generate revised paths, if required, during the time delay '$\Delta T_3$'.

In other embodiments, the unmanned vehicle 102a may generate an intermediate path 514 that bridges a gap between the current position '$P_4$' and a position '$P_5$' on the corrected path 512a. The unmanned vehicle 102a may immediately start moving along the intermediate path 514, or may wait for a time delay '$\Delta T_4$' before stating on the intermediate path 514.

In certain embodiments, the controller at the base station 108 may also generate the time delays '$\Delta T_2$', '$\Delta T_3$', and the intermediate path 514, and coordinate operations of the unmanned vehicles 102a to 102n of the system 500.

The various operations and details of the unmanned vehicles 102, as described above, are for illustration purposes only, and the various embodiments are intended to include or otherwise cover any scenario where a fleet of unmanned vehicles autonomously correct the trajectory of one or more members of the fleet while avoiding collisions with the help of delays, intermediate paths and corrected paths.

V. Other Exemplary Embodiments

Similarly, in other exemplary scenario, the unmanned vehicle 102a may deviate from its planned path 506a due to any non-urgent reasons such as hardware and/or software faults. In such a case, the leader unmanned vehicle 102b or the base station 108 may determine that the unmanned vehicle 102a is off-course, and communicate an appropriate delay, an intermediate path and a corrected path to the unmanned vehicle 102a in order to avoid any collisions. Further, the leader unmanned vehicle 102b or the base station 108 may coordinate between the individual unmanned vehicles 102 of the system 500 for correcting respective paths. The generation of the delay, intermediate path, the corrected path and modification of the paths of the companion unmanned vehicles 102b to 102n may be performed according to one or more techniques as described above.

VI. Exemplary Computer System

Figure 6:
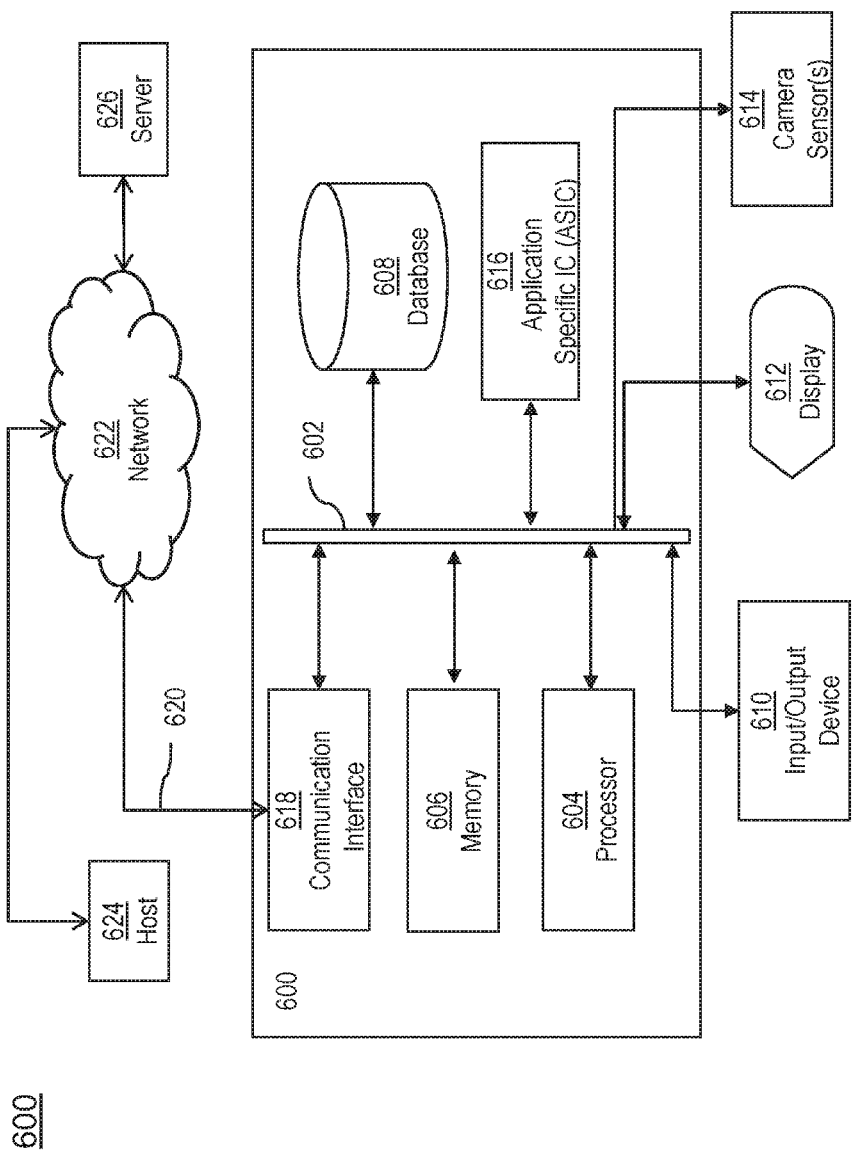
FIG. 6 is a computer system that can be used to implement various exemplary embodiments of the disclosed subject matter.

FIG. 6 illustrates a computer system 600 upon which an embodiment of the invention may be implemented. The computer system 600 may be part of the controller 200, the control unit 206 and/or the controller of the base station 108. In fact, the computer system 600 can be part of any component of the unmanned vehicle 102. Although, the computer system 600 is depicted with respect to a particular device or equipment, it is contemplated that other devices or equipment (e.g., network elements, servers, etc.) within FIG. 6 can deploy the illustrated hardware and components of the system 600. The computer system 600 is programmed (e.g., via computer program code or instructions) to correct a trajectory of the unmanned vehicle 102 and includes a communication mechanism such as a bus 602 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 600, or a portion thereof, constitutes a means for performing one or more steps for correcting the trajectory of the unmanned vehicle 102.

A bus 602 includes one or more parallel conductors of information so that information is transferred quickly among devices coupled to the bus 602. One or more processors 604 for processing information are coupled with the bus 602.

The processor (or multiple processors) 604 performs a set of operations on information as specified by computer program code related to generate a delay and correcting the trajectory of the unmanned vehicle 102. The computer program code is a set of instructions or statements providing instructions for the operation of the processor 604 and/or the computer system 600 to perform specified functions. The code, for example, may be written in a computer programming language that is compiled into a native instruction set of the processor 604. The code may also be written directly using the native instruction set (e.g., machine language). The set of operations include bringing information in from the bus 602 and placing information on the bus 602. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 604, such as a sequence of operation codes, constitute processor instructions, also called computer system instructions or, simply, computer instructions. The processors 604 may be implemented as mechanical, electrical, magnetic, optical, chemical, or quantum components, among others, alone or in combination.

The computer system 600 also includes a memory 606 coupled to the bus 602. The memory 606, such as a Random Access Memory (RAM) or any other dynamic storage device, stores information including processor instructions for storing information and instructions to be executed by the processor 604. The dynamic memory 606 allows information stored therein to be changed by the computer system 600. RAM allows a unit of information stored at a location called a memory address to be stored and retrieved independently of information at neighboring addresses. The memory 606 is also used by the processor 604 to store temporary values during execution of processor instructions. The computer system 600 also includes a Read Only Memory (ROM) or any other static storage device coupled to the bus 602 for storing static information, including instructions, that is not changed by the computer system 600. Some memory is composed of volatile storage that loses the information stored thereon when power is lost. Also coupled to the bus 602 is a non-volatile (persistent) storage device 608, such as a magnetic disk, a solid state disk, optical disk or flash card, for storing information, including instructions, that persists even when the computer system 600 is turned off or otherwise loses power.

Information, including instructions for correcting trajectory of the unmanned vehicle 102 is provided to the bus 602 for use by the processor 604 from an external input device 610, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in the computer system 600. Other external devices coupled to the bus 602, used primarily for interacting with humans, include a display 612, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and a pointing device 616, such as a mouse, a trackball, cursor direction keys, or a motion sensor, for controlling a position of a small cursor image presented on the display 612 and issuing commands associated with graphical elements presented on the display 612, and one or more camera sensors 614 for capturing, recording and causing to store one or more still and/or moving images (e.g., videos, movies, etc.) which also may comprise audio recordings. Further, the display 612 may be a touch enabled display such as capacitive or resistive screen. In some embodiments, for example, in embodiments in which the computer system 600 performs all functions automatically without human input, one or more of the external input device 610, and the display device 612 may be omitted.

In the illustrated embodiment, special purpose hardware, such as an ASIC 616, is coupled to the bus 602. The special purpose hardware is configured to perform operations not performed by the processor 604 quickly enough for special purposes. Examples of ASICs include graphics accelerator cards for generating images for the display 612, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 also includes one or more instances of a communication interface 618 coupled to the bus 602. The communication interface 618 provides a one-way or two-way communication coupling to a variety of external devices that operate with their own processors, such as printers, scanners and external disks. In general, the coupling is with a network link 620 that is connected to a local network 622 to which a variety of external devices with their own processors are connected. For example, the communication interface 618 may be a parallel port or a serial port or a Universal Serial Bus (USB) port on a personal computer. In some embodiments, the communication interface 618 is an Integrated Services Digital Network (ISDN) card, a Digital Subscriber Line (DSL) card, or a telephone modem that provides an information communication connection to a corresponding type of a telephone line. In some embodiments, the communication interface 618 is a cable modem that converts signals on the bus 602 into signals for a communication connection over a coaxial cable or into optical signals for a communication connection over a fiber optic cable. As another example, the communications interface 618 may be a Local Area Network (LAN) card to provide a data communication connection to a compatible LAN, such as Ethernet or an Asynchronous Transfer Mode (ATM) network. In one embodiment, wireless links may also be implemented. For wireless links, the communication interface 618 sends or receives or both sends and receives electrical, acoustic or electromagnetic signals, including infrared and optical signals that carry information streams, such as digital data. For example, in wireless handheld devices, such as mobile telephones like cell phones, the communication interface 618 includes a radio band electromagnetic transmitter and receiver called a radio transceiver. In certain embodiments, the communication interface 618 enables connection to the communication network 104 for correcting the trajectory of the unmanned vehicle 102. Further, the communication interface 618 can include peripheral interface devices, such as a thunderbolt interface, a Personal Computer Memory Card International Association (PCMCIA) interface, etc. Although a single communication interface 618 is depicted, multiple communication interfaces can also be employed.

The term "computer-readable medium" as used herein refers to any medium that participates in providing information to the processor 604, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 608. Volatile media include, for example, the dynamic memory 606. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 616.

The network link 620 typically provides information communication using transmission media through one or more networks to other devices that use or process the information. For example, the network link 620 may provide a connection through the local network 622 to a host computer 624 or to ISP equipment operated by an Internet Service Provider (ISP).

A computer called a server host 626, connected to the Internet, hosts a process that provides a service in response to information received over the Internet. For example, the server host 626 hosts a process that provides information representing video data for presentation at the display 612. It is contemplated that the components of the computer system 600 can be deployed in various configurations within other computer systems, e.g., the host 624 and the server 626.

At least some embodiments of the invention are related to the use of the computer system 600 for implementing some or all of the techniques described herein. According to one embodiment of the invention, those techniques are performed by the computer system 600 in response to the processor 604 executing one or more sequences of one or more processor instructions contained in the memory 606. Such instructions, also called computer instructions, software and program code, may be read into the memory 606 from another computer-readable medium such as the storage device 608 or the network link 620. Execution of the sequences of instructions contained in the memory 606 causes the processor 604 to perform one or more of the method steps described herein. In alternative embodiments, hardware, such as the ASIC 616, may be used in place of or in combination with software to implement the invention. Thus, embodiments of the invention are not limited to any specific combination of hardware and software, unless otherwise explicitly stated herein.

Various forms of computer readable media may be involved in carrying one or more sequence of instructions or data or both to the processor 604 for execution. For example, instructions and data may initially be carried on a magnetic disk of a remote computer such as the host 624. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 620. An infrared detector serving as the communication interface 618 receives the instructions and data carried in the infrared signal and places information representing the instructions and data onto the bus 602. The bus 602 carries the information to the memory 606 from which the processor 604 retrieves and executes the instructions using some of the data sent with the instructions. The instructions and data received in the memory 606 may optionally be stored on the storage device 608, either before or after execution by the processor 604.

VI. Alternative Embodiments

While certain embodiments of the invention are described above, and FIGS. 1-6 disclose the best mode for practicing the various inventive aspects, it should be understood that the invention can be embodied and configured in many different ways without departing from the spirit and scope of the invention.

For example, embodiments are disclosed above in the context of an unmanned aerial vehicle. However, embodiments are intended to include or otherwise cover any type of unmanned vehicle or an optionally manned vehicle, including, unmanned or optionally manned aerial vehicles, unmanned or optionally manned terrestrial vehicles (for example, driverless cars), unmanned or optionally manned aquatic vehicles, unmanned or optionally manned oceanic vehicles, unmanned or optionally manned railed vehicles, unmanned or optionally manned amphibious vehicles, unmanned or optionally manned space vehicles, a drone, a gyrocopter, etc. In fact, embodiments are intended to include or otherwise cover configurations of the unmanned vehicle.

Exemplary embodiments are also intended to cover any additional or alternative components of the unmanned vehicle disclosed above. Exemplary embodiments are further intended to cover omission of any component of the unmanned vehicle disclosed above.

Embodiments are disclosed above in the context of correcting a trajectory of an unmanned vehicle or an optionally manned vehicle after deviation of the vehicle from its planned path due to unfavorable conditions and/or obstacles. Embodiments are intended to cover any obstacle such as, but not restricted to, pylons, bridges, power lines, power plants, trees, hills, mountains, buildings, towers, corals, waterbodies, sand banks, orbital debris, dams, water plants, and so forth. Embodiments are also intended to cover any movable obstacle, such as, but not restricted to, birds, aircraft, watercraft, spacecraft, terrestrial vehicles, and so forth.

Embodiments are also intended to cover any region of the operational environment of the unmanned vehicle with adverse conditions that can cause the unmanned vehicle to deviate from its path. Examples of adverse conditions include, but not restricted to, storms, strong winds, snow, rain, hail, avalanches, and so forth.

Embodiments are also intended to cover any non-urgent reasons that can cause an unmanned vehicle to modify its planned path, such as vehicle mechanics (engine, wings, wheels, blades, etc.), electronic systems or sub-systems, navigational anomalies, weather, fuel availability etc.

Embodiments are also intended to include or otherwise include moving an unmanned vehicle in a fleet along its original planned before changing its trajectory to a new or corrected path such that other unmanned vehicles in the fleet can rely on data related to the original planned path during time delay and can have sufficient time to revise their paths, if required.

Embodiments are also intended to include or otherwise include correction of trajectory of an unmanned vehicle or an optionally manned vehicle during aerial operations, underwater operations, terrestrial operations, amphibious operations, and so forth.

Embodiments are also intended to include or otherwise cover usage of GPS data, USGS terrain data, inertial navigation data, GNSS data, telemetry data, ranging tones, and optical imaging to determine the current position of an unmanned vehicle or an optionally manned vehicle and/or guide the unmanned vehicle or the optionally manned vehicle along a planned path.

Embodiments are also intended to include or otherwise cover usage of a current position and a planned path of an unmanned vehicle or an optionally manned vehicle to determine that the vehicle has deviated from its planned path. Embodiments are also intended to include or otherwise cover various techniques to generate a corrected path, a delay and/or an intermediate path for the unmanned vehicle or the optionally manned vehicle in order to correct the trajectory of the vehicle, while avoiding collisions with other vehicles and/or obstacles.

Embodiments are also intended to include or otherwise cover a fleet of unmanned vehicles and/or optionally manned vehicles that autonomously detect that one or more vehicles have gone off-course, and then correct the trajectories of the one or more vehicles by generating appropriate delays, intermediate paths and/or corrected paths, while avoiding collisions. The generated delays and intermediate paths provide sufficient response time to the vehicles of the fleet to modify their paths such that any vehicle to vehicle collisions or collisions with obstacles can be avoided.

Embodiments are also intended to include or otherwise cover methods of manufacturing the unmanned vehicle and/or optionally manned vehicle disclosed above. The methods of manufacturing include or otherwise cover processors and computer programs implemented by processors used to design various elements of the unmanned vehicle or optionally manned vehicle disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations of the unmanned vehicles disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A method of controlling an unmanned vehicle for use with a companion unmanned vehicle, the unmanned vehicle being operatively coupled to a controller, comprising:
    determining, by the controller, a current position of the unmanned vehicle;
    determining, by the controller, that the unmanned vehicle is off-course based on at least a difference of the current position and a planned path of the unmanned vehicle;
    generating, by the controller, a delay and a corrected path for the unmanned vehicle;
    communicating, by the controller, at least the delay and the corrected path to the companion unmanned vehicle; and
    controlling, by the controller, a movement of the unmanned vehicle such that the unmanned vehicle moves along the corrected path after the delay,
    wherein the delay is a time delay, which provides the unmanned vehicle with a period of time before a change is initiated in the first trajectory of the unmanned vehicle to a second trajectory, and
    wherein the time delay is at one of an indefinite delay, a predetermined time delay and specific time period delay before the change is initiated so that the unmanned vehicle travels along the corrected path absent any interruptions.

2. The method of claim 1, further comprising:
    determining, by the controller, a planned position of the unmanned vehicle based on the planned path;
    comparing, by the controller, the planned position based on the planned path with the current position of the unmanned vehicle;
    determining, by the controller, that the unmanned vehicle is off-course based on the comparison between the planned position and the current position.

3. The method of claim 1, further comprising generating the corrected path based on at least the difference between the planned position and the current position.

4. The method of claim 1, wherein the delay is a time period between determination that the unmanned vehicle is off-course and commencement of travel on the corrected path.

5. The method of claim 1, further comprising:
    generating, by the controller, an intermediate path based on at least the current position and the corrected path; and
    controlling, by the controller, the movement of the unmanned vehicle such that the unmanned vehicle moves along the intermediate path during the delay.

6. The method of claim 1, further comprising:
    receiving, by the controller, a planned path of the companion unmanned vehicle; and
    generating the delay based on at least the current position of the unmanned vehicle and the planned path of the companion unmanned vehicle.

7. The method of claim 1, further comprising controlling, by the controller, the movement of the unmanned vehicle during the delay in order to impede a collision with the companion unmanned vehicle.

8. The method of claim 1, wherein the corrected path is the planned path or a new path distinct from the planned path.

9. An unmanned vehicle for use with a companion unmanned vehicle, comprising:
    a position unit that is configured to determine a current position of the unmanned vehicle;
    a memory unit that is configured to store a planned path of the unmanned vehicle; and
    a control unit disposed in communication with the position unit and the memory unit, the control unit configured to:
        determine that the unmanned vehicle is off-course based on at least a difference of the current position of the unmanned vehicle and the planned path assigned to the unmanned vehicle;
        generate a delay and a corrected path for the unmanned vehicle;
        communicate at least the delay and the corrected path to the companion unmanned vehicle; and
        control a movement of the unmanned vehicle such that the unmanned vehicle moves along the corrected path after the delay,
    wherein the delay is a time delay, which provides the unmanned vehicle with a period of time before a change is initiated in the first trajectory of the unmanned vehicle to a second trajectory, and
    wherein the time delay is at one of an indefinite delay, a predetermined time delay and specific time period delay before the change is initiated and the unmanned vehicle travels along the corrected path absent any interruptions.

10. The unmanned vehicle of claim 9, further comprising a communication unit that is configured to receive a planned path of a companion unmanned vehicle, wherein the control unit is further configured to generate the delay based on at least the planned path of the companion unmanned vehicle and the current position of the unmanned vehicle.

11. The unmanned vehicle of claim 9, wherein the control unit is further configured to:
    determine a planned position of the unmanned vehicle based on the planned path;
    compare the planned position based on the planned path with the current position of the unmanned vehicle; and
    determine that the unmanned vehicle is off-course based on the comparison between the planned position and the current position.

12. The unmanned vehicle of claim 11, wherein the control unit is further configured to generate the corrected path based on at least the difference between the planned position and the current position.

13. The unmanned vehicle of claim 9, wherein the delay is a time period between determination that the unmanned vehicle is off-course and commencement of travel on the corrected path.

14. The unmanned vehicle of claim 9, wherein the control unit is further configured to:
generate an intermediate path based on at least the current position and the corrected path; and
control the movement of the unmanned vehicle such that the unmanned vehicle moves along the intermediate path during the delay.

15. The unmanned vehicle of claim 9, wherein the control unit is further configured to control the movement of the unmanned vehicle during the delay in order to impede a collision with the companion unmanned vehicle.

16. The unmanned vehicle of claim 9, further comprising a detection unit that is configured to detect an obstacle, wherein the control unit is further configured to control the movement of the unmanned vehicle in order to impede a collision with the obstacle.

17. The unmanned vehicle of claim 9, wherein the unmanned vehicle is one of an unmanned aerial vehicle, an unmanned terrestrial vehicle, an unmanned aquatic vehicle, an unmanned space vehicle, and an optionally manned vehicle.

18. A system, comprising:
a plurality of unmanned vehicles spaced from each other, each of the plurality of unmanned vehicles including:
a position unit configured to determine a current position of the unmanned vehicle; and
a memory unit configured to store a planned path of the unmanned vehicle; and
a controller disposed in communication with the each of the plurality of unmanned vehicles, the controller configured to:
receive the current position and the planned path of each of the plurality of unmanned vehicles;
determine that at least one unmanned vehicle is off-course based on at least a difference of the current position and the planned path of each of the plurality of unmanned vehicles;
generate a delay and a corrected path for the at least one unmanned vehicle;
communicate at least the delay and the corrected path to each of the plurality of unmanned vehicles; and
control a movement of the at least one unmanned vehicle such that the at least one unmanned vehicle moves along the corrected path after the delay,
wherein the delay is a time delay, which provides the unmanned vehicle with a period of time before a change is initiated in the first trajectory of the unmanned vehicle to a second trajectory, and
wherein the time delay is at one of an indefinite delay, a predetermined time delay and specific time period delay before the change is initiated and the unmanned vehicle travels along the corrected path absent any interruptions.

19. The system of claim 18, wherein the controller is further configured to:
generate an intermediate path based on at least the current position and the corrected path of the at least one unmanned vehicle; and
control the movement of the at least one unmanned vehicle such that the at least one unmanned vehicle moves along the intermediate path during the delay.

20. The system of claim 18, wherein the controller is further configured to:
determine a planned position of the at least one unmanned vehicle based on the planned path; and
generate the corrected path based at least on a difference between the planned position and the current position of the at least one unmanned vehicle.

* * * * *